(12) United States Patent  
Gulati et al.

(10) Patent No.: US 11,797,952 B2  
(45) Date of Patent: Oct. 24, 2023

(54) AUTOMATED VEHICLE REPAIR ESTIMATION BY ADAPTIVE ENSEMBLING OF MULTIPLE ARTIFICIAL INTELLIGENCE FUNCTIONS

(71) Applicant: Mitchell International, Inc., San Diego, CA (US)

(72) Inventors: Abhijeet Gulati, San Diego, CA (US); Joseph Hyland, San Diego, CA (US)

(73) Assignee: Mitchell International, Inc., San Diego, CA (US)

( * ) Notice: Subject to any disclaimer, the term of this patent is extended or adjusted under 35 U.S.C. 154(b) by 74 days.

(21) Appl. No.: 17/039,339

(22) Filed: Sep. 30, 2020

(65) Prior Publication Data

US 2021/0097506 A1 Apr. 1, 2021

Related U.S. Application Data

(60) Provisional application No. 62/908,354, filed on Sep. 30, 2019, provisional application No. 62/908,361, (Continued)

(51) Int. Cl.
*G06Q 10/20* (2023.01)
*G06N 5/04* (2023.01)
(Continued)

(52) U.S. Cl.
CPC ......... *G06Q 10/20* (2013.01); *G06F 18/2148* (2023.01); *G06N 5/04* (2013.01);
(Continued)

(58) Field of Classification Search
None
See application file for complete search history.

(56) References Cited

U.S. PATENT DOCUMENTS

| 5,432,904 A | 7/1995 | Wong |
| 5,504,674 A | 4/1996 | Chen et al. |

(Continued)

FOREIGN PATENT DOCUMENTS

| EP | 3627408 A1 * | 5/2019 | ............. G06Q 10/06 |
| WO | WO2017048516 A1 * | 3/2017 | ............. G06Q 10/00 |

(Continued)

OTHER PUBLICATIONS

K. Patil, M. Kulkarni, A. Sriraman and S. Karande, "Deep Learning Based Car Damage Classification," 2017 16th IEEE International Conference on Machine Learning and Applications (ICMLA), 2017, pp. 50-54 (Year: 2017).*

(Continued)

*Primary Examiner* — Paul R Fisher
(74) *Attorney, Agent, or Firm* — Sheppard Mullin Richter & Hampton LLP

(57) ABSTRACT

Automated vehicle repair estimation by adaptive ensembling of multiple artificial intelligence functions is provided. A method comprises receiving, from a plurality of sources, vehicle repair recommendation sets identifying recommended vehicle repair operations for damaged vehicle components; selecting, by a trained artificial intelligence function, one of the operations for each component based on a plurality of learned states; generating a composite vehicle repair recommendation set identifying the selected operation; providing the composite vehicle repair recommendation set to one or more claims management systems; and repeatedly retraining the trained artificial intelligence function by adjusting the learned states according to the vehicle damage objects received, and the corresponding composite vehicle repair recommendation generated, since the last retraining of the trained artificial intelligence function.

17 Claims, 18 Drawing Sheets

Related U.S. Application Data filed on Sep. 30, 2019, provisional application No. 62/908,348, filed on Sep. 30, 2019.

(51) Int. Cl.
| | |
|---|---|
| *G06Q 10/10* | (2023.01) |
| *G06Q 40/08* | (2012.01) |
| *G06T 7/00* | (2017.01) |
| *G06N 20/20* | (2019.01) |
| *G06N 20/00* | (2019.01) |
| *G06F 18/214* | (2023.01) |

(52) U.S. Cl.
CPC ............. *G06N 20/00* (2019.01); *G06N 20/20* (2019.01); *G06Q 10/10* (2013.01); *G06Q 40/08* (2013.01); *G06T 7/0002* (2013.01); *G06T 7/0004* (2013.01); *G06T 2207/20081* (2013.01); *G06T 2207/30248* (2013.01)

(56) References Cited

U.S. PATENT DOCUMENTS

| | | | |
|---|---|---|---|
| 5,950,169 | A | 9/1999 | Borghesi et al. |
| 6,047,858 | A | 4/2000 | Romer |
| 6,107,399 | A | 8/2000 | Selley et al. |
| 6,381,561 | B1 | 4/2002 | Bomar, Jr. et al. |
| 6,470,303 | B2 | 10/2002 | Kidd et al. |
| 6,885,981 | B2 | 4/2005 | Bomar, Jr. et al. |
| 7,197,444 | B2 | 3/2007 | Bomar, Jr. et al. |
| 7,359,821 | B1 | 4/2008 | Smith et al. |
| 7,502,772 | B2 | 3/2009 | Kidd et al. |
| 7,698,086 | B2 | 4/2010 | Kidd et al. |
| 7,716,002 | B1 | 5/2010 | Smith et al. |
| 7,974,808 | B2 | 7/2011 | Smith et al. |
| 8,019,629 | B1 | 9/2011 | Medina, III et al. |
| 8,160,904 | B1 | 4/2012 | Smith |
| 8,260,639 | B1 | 9/2012 | Medina,III et al. |
| 8,712,806 | B1 | 4/2014 | Medina, III et al. |
| 8,725,543 | B1 | 5/2014 | Hanson et al. |
| 9,218,626 | B1 | 12/2015 | Haller, Jr. |
| 9,672,497 | B1* | 6/2017 | Lewis ................... G06F 40/284 |
| 9,721,400 | B1 | 8/2017 | Oakes, III et al. |
| 10,339,728 | B1 | 7/2019 | Oakes, III et al. |
| 10,360,601 | B1 | 7/2019 | Adegan |
| 10,366,370 | B1 | 7/2019 | Binion et al. |
| 10,373,262 | B1* | 8/2019 | Haller, Jr. .............. G06Q 40/08 |
| 10,410,439 | B1 | 10/2019 | Gingrich et al. |
| 10,510,142 | B1 | 12/2019 | Dohner et al. |
| 10,657,707 | B1 | 5/2020 | Leise |
| 10,685,401 | B1 | 6/2020 | Hanson et al. |
| 10,922,664 | B2 | 2/2021 | Vahidi |
| 10,922,726 | B1* | 2/2021 | Nelson ................ G06Q 30/0283 |
| 10,949,814 | B1 | 3/2021 | Nelson et al. |
| 11,313,973 | B2* | 4/2022 | Molina-Markham ........................ G01S 19/215 |
| 11,556,902 | B2 | 1/2023 | Gulati et al. |
| 2002/0007237 | A1* | 1/2002 | Phung ................ G05B 23/0275 709/219 |
| 2002/0016655 | A1 | 2/2002 | Joao |
| 2005/0108065 | A1 | 5/2005 | Dorfstatter |
| 2005/0267774 | A1 | 12/2005 | Merritt et al. |
| 2008/0082347 | A1 | 4/2008 | Villalobos et al. |
| 2008/0222062 | A1* | 9/2008 | Liu .......................... G06N 7/01 706/15 |
| 2013/0317694 | A1 | 11/2013 | Merg et al. |
| 2014/0081675 | A1 | 3/2014 | Ives et al. |
| 2014/0122130 | A1 | 5/2014 | Kelly et al. |
| 2014/0277902 | A1 | 9/2014 | Koch |
| 2014/0279707 | A1 | 9/2014 | Joshua et al. |
| 2015/0012169 | A1* | 1/2015 | Coard .............. G06Q 10/06316 705/305 |
| 2015/0213556 | A1 | 7/2015 | Haller, Jr. et al. |
| 2016/0063774 | A1 | 3/2016 | Afshar |
| 2016/0078403 | A1 | 3/2016 | Sethi et al. |
| 2016/0104125 | A1 | 4/2016 | Chapman et al. |
| 2016/0178465 | A1 | 6/2016 | Smith et al. |
| 2017/0147990 | A1 | 5/2017 | Franke et al. |
| 2017/0147991 | A1 | 5/2017 | Franke et al. |
| 2017/0148101 | A1 | 5/2017 | Franke et al. |
| 2017/0148102 | A1* | 5/2017 | Franke ................. G06K 9/6267 |
| 2017/0169634 | A1 | 6/2017 | Mattern et al. |
| 2017/0221069 | A1* | 8/2017 | Remboski ........... G07C 5/0825 |
| 2017/0278004 | A1 | 9/2017 | McElhinney et al. |
| 2017/0293894 | A1 | 10/2017 | Taliwal et al. |
| 2017/0337593 | A1 | 11/2017 | Tong |
| 2018/0121888 | A1 | 5/2018 | O'Reilly |
| 2018/0173217 | A1 | 6/2018 | Spiro et al. |
| 2018/0260793 | A1 | 9/2018 | Li et al. |
| 2018/0300576 | A1 | 10/2018 | Dalyac et al. |
| 2018/0322413 | A1* | 11/2018 | Yocam ................... G06N 20/00 |
| 2019/0073641 | A1 | 3/2019 | Utke |
| 2019/0130468 | A1* | 5/2019 | Lerman .............. G06Q 30/0281 |
| 2019/0340190 | A1* | 11/2019 | Ganteaume ............. G10L 15/34 |
| 2019/0392401 | A1 | 12/2019 | Bellini |
| 2020/0043355 | A1* | 2/2020 | Kwatra ............. G06Q 10/0633 |
| 2020/0234515 | A1 | 7/2020 | Gronsbell et al. |
| 2020/0258057 | A1 | 8/2020 | Farahat et al. |
| 2020/0293394 | A1 | 9/2020 | Abhinav |
| 2020/0349370 | A1 | 11/2020 | Lambert et al. |
| 2021/0042543 | A1 | 2/2021 | Lambert et al. |
| 2021/0097489 | A1 | 4/2021 | Gulati |
| 2021/0097504 | A1 | 4/2021 | Gulati et al. |
| 2021/0097505 | A1 | 4/2021 | Gulati |
| 2021/0097622 | A1 | 4/2021 | Gulati et al. |
| 2021/0133695 | A1 | 5/2021 | Nichols et al. |

FOREIGN PATENT DOCUMENTS

| | | | | |
|---|---|---|---|---|
| WO | WO2018034913 | A1 * | 2/2018 | ............. G06Q 50/00 |
| WO | WO2019070290 | A1 * | 4/2019 | ............. G01M 15/10 |

OTHER PUBLICATIONS

R. Singh, M. P. Ayyar, T. V. Sri Pavan, S. Gosain and R. R. Shah, "Automating Car Insurance Claims Using Deep Learning Techniques," 2019 IEEE Fifth International Conference on Multimedia Big Data (BigMM), 2019, pp. 199-207 (Year: 2019).*

Li, Kang. "Representation Learning on Multiple Sources." Order No. 3629782 State University of New York at Buffalo, 2014. Ann Arbor: ProQuest (Year: 2014).*

Extended European Search Report in EP20199277.3, dated Jan. 26, 2021.

Prytz, Rune. "Machine learning methods for vehicle predictive maintenance using off-board and on-board data", Doctoral Dissertation, No. 9, Halmstad University Press, 2014, 96 pages.

Prytz, Rune, et al., Predicting the need for vehicle compressor repairs using maintenance records and logged vehicle data, Engineering applications of artificial intelligence, 41, 139-150 (2015).

Jayawardena, Srimal, Image based automatic vehicle damage detection. Thesis submitted for Doctor of Philosophy at the Australian National University, Nov. 2013, 199 pages.

Unknown, Random Forest, Aug. 7, 2019, www.wikipedia.org (2019).

Susto et al., "Machine Learning for Predictive Maintenance: A Multiple Classifier Approach", IEEE Transactions on Industrial Informatics, vol. 11, No. 3, 812-820, Jun. 2015.

* cited by examiner

Aggregate

Preferential

Random

1100

```
┌─────────────────────────────────────┐
│ Receive a vehicle damage object for │
│ a damaged vehicle, wherein the      │
│ vehicle damage object includes a    │
│ plurality of images of the          │
│ damaged vehicle.                    │
│ 1102                                │
└─────────────────────────────────────┘
                  ▼
┌─────────────────────────────────────┐
│ Fragment the object into a plurality│
│ of vehicle damage object fragments, │
│ wherein each vehicle damage object  │
│ fragment includes at least one of   │
│ the images of the damaged vehicle.  │
│ 1104                                │
└─────────────────────────────────────┘
                  ▼
┌─────────────────────────────────────┐
│ Provide each of the vehicle damage  │
│ object fragments to a respective    │
│ one of a plurality of artificial    │
│ intelligence functions.             │
│ 1106                                │
└─────────────────────────────────────┘
                  ▼
┌─────────────────────────────────────┐
│ Receive a respective vehicle repair │
│ recommendation set from each of the │
│ artificial intelligence functions,  │
│ wherein each vehicle repair         │
│ recommendation set is based on a    │
│ respective one of the vehicle       │
│ damage object fragments, and        │
│ wherein each of the vehicle repair  │
│ recommendation sets identifies a    │
│ recommended vehicle repair          │
│ operation of a plurality of the     │
│ vehicle repair operations for the   │
│ damaged vehicle.                    │
│ 1108                                │
└─────────────────────────────────────┘
                  ▼
                 ⎛A⎞
```

FIG. 11A

Adaptive

US 11,797,952 B2

AUTOMATED VEHICLE REPAIR ESTIMATION BY ADAPTIVE ENSEMBLING OF MULTIPLE ARTIFICIAL INTELLIGENCE FUNCTIONS

CROSS REFERENCE TO RELATED APPLICATIONS

The present application claims priority to U.S. Provisional Patent Application No. 62/908,348, filed Sep. 30, 2019, entitled "Methods For Processing Data From An Artificial Intelligence Model And Devices Thereof"; U.S. Provisional Patent Application No. 62/908,354, filed Sep. 30, 2019, entitled "Methods For Processing Data From An Artificial Intelligence Model Using Voting Technique And Devices Thereof"; and U.S. Provisional Patent Application No. 62/908,361, filed Sep. 30, 2019, entitled "Methods For Processing Data From An Artificial Intelligence Model Using Preferential Technique And Devices Thereof"; the disclosures thereof are incorporated by reference herein in their entirety.

The present application is related to U.S. patent application Ser. No. 17/039,231, filed Sep. 30, 2020, entitled "Automated Vehicle Repair Estimation By Aggregate Ensembling Of Multiple Artificial Intelligence Functions", now U.S. Pat. No. 11,556,902; U.S. patent application Ser. No. 17/039,262, filed Sep. 30, 2020, entitled "Automated Vehicle Repair Estimation By Voting Ensembling Of Multiple Artificial Intelligence Functions"; U.S. patent application Ser. No. 17/039,287, filed Sep. 30, 2020, entitled "Automated Vehicle Repair Estimation By Preferential Ensembling Of Multiple Artificial Intelligence Functions"; and U.S. patent application Ser. No. 17/039,311, filed Sep. 30, 2020, entitled "Automated Vehicle Repair Estimation By Random Ensembling Of Multiple Artificial Intelligence Functions"; the disclosures thereof are incorporated by reference herein in their entirety.

DESCRIPTION OF RELATED ART

The disclosed technology relates generally to artificial intelligence (AI), and more particularly some embodiments relate to the use of in vehicle repair estimation.

SUMMARY

A claimed solution rooted in computer technology overcomes problems specifically arising in the realm of computer technology.

In general, one aspect disclosed features a system, comprising: a hardware processor; and a non-transitory machine-readable storage medium encoded with instructions executable by the hardware processor to perform a method comprising: receiving a vehicle damage object for a damaged vehicle, wherein the vehicle damage object includes a plurality of metadata objects of the damaged vehicle; providing the vehicle damage object to a plurality of sources; receiving a plurality of vehicle repair recommendation sets for the damaged vehicle from the sources, wherein each of the vehicle repair recommendation sets identifies at least one recommended vehicle repair operation of a plurality of the vehicle repair operations for at least one component of the damaged vehicle; selecting, by a trained artificial intelligence function, one of the recommended vehicle repair operations for each component of the damaged vehicle based on a plurality of learned states; generating a composite vehicle repair recommendation set that identifies the selected recommended vehicle repair operation; providing the composite vehicle repair recommendation set to one or more claims management systems; and repeatedly retraining the trained artificial intelligence function by adjusting the learned states according to the vehicle damage objects received, and the corresponding composite vehicle repair recommendation generated, since the last retraining of the trained artificial intelligence function.

Embodiments of the system may include one or more of the following features. In some embodiments, the learned states are weights; and each source has a respective weight for each recommended vehicle repair operation for each component. In some embodiments, generating the composite vehicle repair recommendation set comprises: selecting one or more of the metadata objects of the damaged vehicle, and identifying the selected metadata objects in the generated composite vehicle repair recommendation set. In some embodiments, each of the vehicle repair recommendation sets identifies a score and/or confidence percentage for the recommended vehicle repair operation; and the method further comprises: identifying the scores for the recommended vehicle repair operations in the generated composite vehicle repair recommendation set. In some embodiments, each of the vehicle repair recommendation sets is generated by a respective further artificial intelligence function. In some embodiments, each of the further artificial intelligence functions is trained. In some embodiments, the method further comprises requesting one or more of the further artificial intelligence functions be re-trained when a predetermined event occurs.

In general, one aspect disclosed features non-transitory machine-readable storage medium encoded with instructions executable by a hardware processor of a computing component, the machine-readable storage medium comprising instructions to cause the hardware processor to perform a method comprising: receiving a vehicle damage object for a damaged vehicle, wherein the vehicle damage object includes a plurality of metadata objects of the damaged vehicle; providing the vehicle damage object to a plurality of sources; receiving a plurality of vehicle repair recommendation sets for the damaged vehicle from the sources, wherein each of the vehicle repair recommendation sets identifies at least one recommended vehicle repair operation of a plurality of the vehicle repair operations for at least one component of the damaged vehicle; selecting, by a trained artificial intelligence function, one of the recommended vehicle repair operations for each component of the damaged vehicle based on a plurality of learned states; generating a composite vehicle repair recommendation set that identifies the selected recommended vehicle repair operation; providing the composite vehicle repair recommendation set to one or more claims management systems; and repeatedly retraining the trained artificial intelligence function by adjusting the learned states according to the vehicle damage objects received, and the corresponding composite vehicle repair recommendation generated, since the last retraining of the trained artificial intelligence function.

Embodiments of the non-transitory machine-readable storage medium may include one or more of the following features. In some embodiments, the learned states are weights; and each source has a respective weight for each recommended vehicle repair operation for each component. In some embodiments, generating the composite vehicle repair recommendation set comprises: selecting one or more of the metadata objects of the damaged vehicle, and identifying the selected metadata objects in the generated composite vehicle repair recommendation set. In some embodiments, each of the vehicle repair recommendation sets identifies a score and/or confidence percentage for the recommended vehicle repair operation; and the method further comprises: identifying the scores for the recommended vehicle repair operations in the generated composite vehicle repair recommendation set. In some embodiments, each of the vehicle repair recommendation sets is generated by a respective further artificial intelligence function. In some embodiments, each of the further artificial intelligence functions is trained. In some embodiments, the method further comprises requesting one or more of the further artificial intelligence functions be re-trained when a predetermined event occurs.

In general, one aspect disclosed features a method comprising: receiving a vehicle damage object for a damaged vehicle, wherein the vehicle damage object includes a plurality of metadata objects of the damaged vehicle; providing the vehicle damage object to a plurality of sources; receiving a plurality of vehicle repair recommendation sets for the damaged vehicle from the sources, wherein each of the vehicle repair recommendation sets identifies at least one recommended vehicle repair operation of a plurality of the vehicle repair operations for at least one component of the damaged vehicle; selecting, by a trained artificial intelligence function, one of the recommended vehicle repair operations for each component of the damaged vehicle based on a plurality of learned states; generating a composite vehicle repair recommendation set that identifies the selected recommended vehicle repair operation; providing the composite vehicle repair recommendation set to one or more claims management systems; and repeatedly retraining the trained artificial intelligence function by adjusting the learned states according to the vehicle damage objects received, and the corresponding composite vehicle repair recommendation generated, since the last retraining of the trained artificial intelligence function.

Embodiments of the method may include one or more of the following features. In some embodiments, the learned states are weights; and each source has a respective weight for each recommended vehicle repair operation for each component. In some embodiments, generating the composite vehicle repair recommendation set comprises: selecting one or more of the metadata objects of the damaged vehicle, and identifying the selected metadata objects in the generated composite vehicle repair recommendation set. In some embodiments, each of the vehicle repair recommendation sets identifies a score and/or confidence percentage for the recommended vehicle repair operation; and the method further comprises: identifying the scores for the recommended vehicle repair operations in the generated composite vehicle repair recommendation set. In some embodiments, each of the vehicle repair recommendation sets is generated by a respective further artificial intelligence function. In some embodiments, each of the further artificial intelligence functions is trained. Some embodiments comprise requesting one or more of the further artificial intelligence functions be re-trained when a predetermined event occurs.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

With the advent of high-power, cost effective computing systems came the increased automation of numerous facets of our contemporary society. In the insurance and other casualty and loss industries, for example, computerized claims estimating, processing, tracking and payment systems have long been in use to streamline processes and to expedite claims handling and closure.

Advances in Artificial Intelligence (AI) have enabled the use of AI to assist in the estimating process. However, AI implementations may differ markedly. For example, given the same input, two different AI functions may produce quite different estimates. Embodiments of the disclosed technology exploit these variations in AI implementations to harness the power of multiple AI functions in generating a vehicle repair estimate. In various embodiments, a claim package is provided to a plurality of AI functions in various ways, and the estimates output by the AI functions are combined in various ways.

Some embodiments employ an aggregating approach. According to these embodiments, the same claim package is provided to each of the AI functions, and the estimates produced by the AI functions are aggregated.

Some embodiments employ a voting approach. According to these embodiments, the same claim package is provided to each of the AI functions, and the estimates produced by the AI functions are combined according to scores assigned to the estimates by the AI functions.

Some embodiments employ a preferential approach. According to these embodiments, the same claim package is provided to each of the AI functions, and each of the AI functions is assigned a respective rank. The estimates produced by the AI functions are selected according to the ranks.

Some embodiments employ a random approach. According to these embodiments, different portions of the claim package are provided to the AI functions in a random manner, and the estimates produced by the AI functions are combined.

Some embodiments employ an adaptive approach. According to these embodiments, weights are learned for each operation for each component for each AI function. The same claim package is provided to each of the AI functions, and the estimates produced by the AI functions are selected according to the learned weights.

In this description, various embodiments are disclosed for vehicle repair estimate workflow automation. However, embodiments of the disclosed technology apply to other processes as well. For example, embodiments may apply to generating estimates for medical procedures, and the like. These and other applications will be apparent to one skilled in the relevant art after reading this description. Before describing embodiments of the disclosed technology in detail, it is useful to describe an example environment in which the disclosed technology may be implemented.

Figure 1:
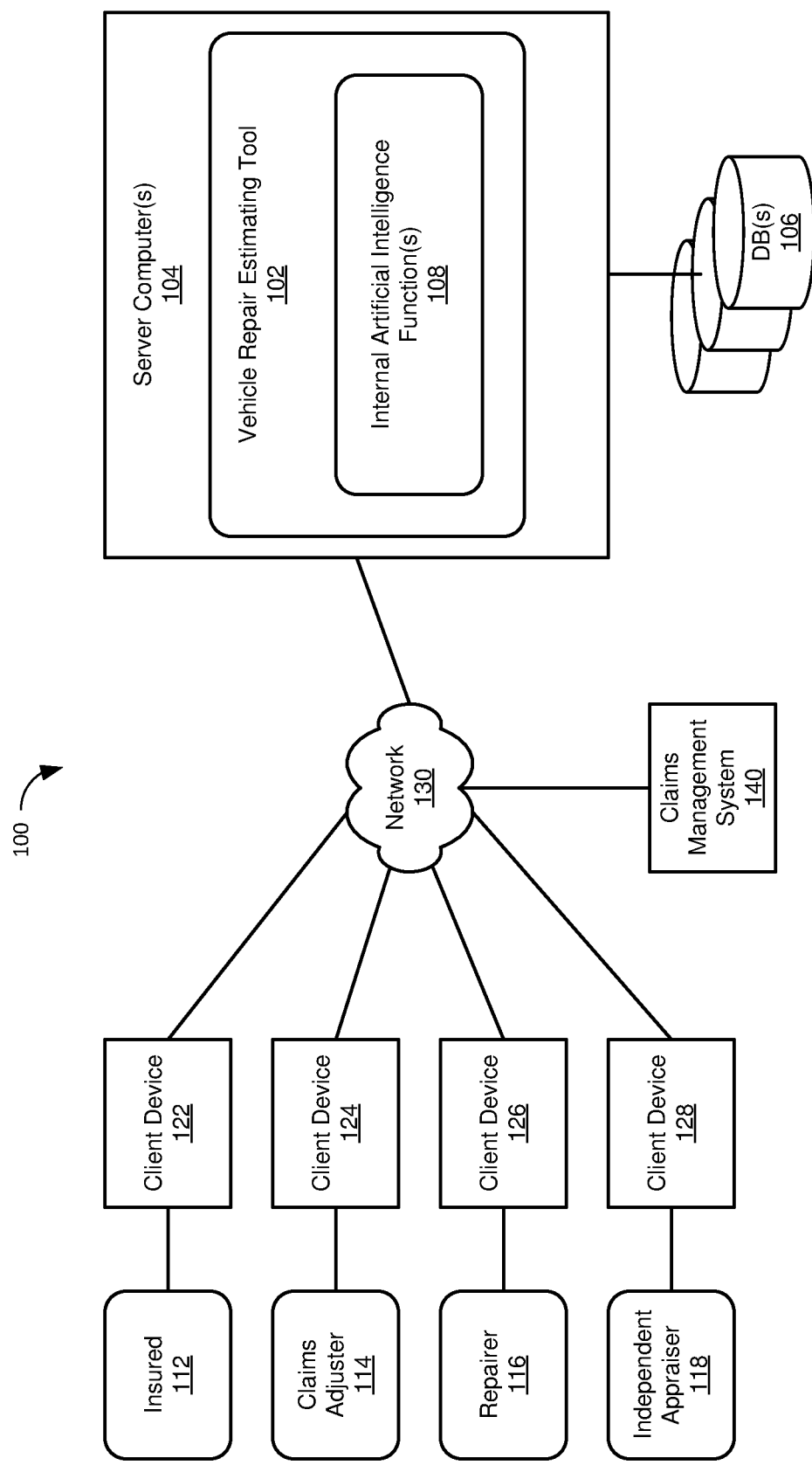
FIG. 1 illustrates a vehicle estimate automation system according to some embodiments of the disclosed technology.

FIG. 1 illustrates a vehicle estimate automation system 100 according to some embodiments of the disclosed technology. Multiple users may be involved in the vehicle repair workflow. For example, referring to FIG. 1, the users may include the insured 112, a claims adjuster 114, a repairer 116 such as an employee of a repair shop, an independent appraiser 118, and the like. Each user may employ a respective client device 122, 124, 126, 128. Each client device may be implemented as a desktop computer, laptop computer, smart phone, smart glasses, embedded computers and displays, diagnostic devices and the like.

The system 100 may include a vehicle repair estimate automation tool 102, which may be implemented as one or more software packages executing on one or more server computers 104. Each user may employ a respective client device 122, 124, 126, 128 to access the tool 102 over a network 130 such as the Internet.

The tool 102 may include a plurality of AI functions 108. The AI functions 108 may be implemented in any manner. For example, one or more of the AI functions 108 may be implemented as trained machine learning models. The machine learning models may include computer vision machine learning models, natural language processing machine learning models, and the like. The system 100 may include one or more databases 106, which may store vehicle repair procedures, completed estimates, estimates in process, data regarding parts, part costs, labor, labor costs, and the like. The databases 106 may include one or more natural language processing (NLP) techniques. The natural language processing databases may include rules, documents, and the like for use with the natural language processing machine learning models. In some embodiments, a NLP machine learning model may be trained with vehicle repair content. The vehicle repair content may include vehicle specifications, vehicle repair procedures, position statements, parts catalogs, and the like. The NLP machine learning model may ingest and process the vehicle repair content to generate machine learning rules and processed NLP content databases. The NLP machine learning model may further curate the ingested vehicle repair content through other artificial intelligence technologies including image analysis, text mining, deep analysis, and the like.

The system 100 may include a claims management system 140. The claims management system 140 may be operated, for example, by a vehicle insurer.

Figure 2:
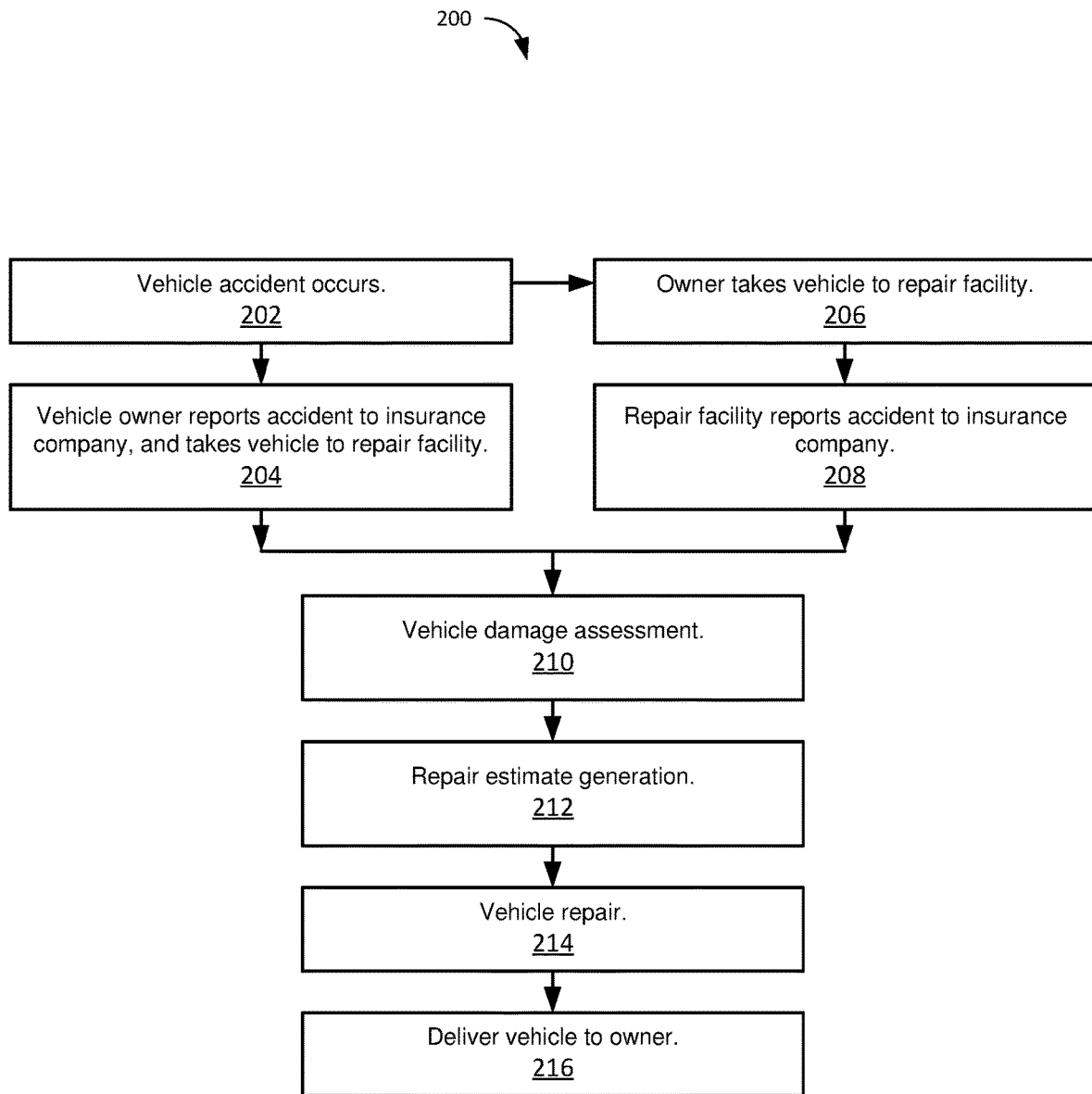
FIG. 2 illustrates a process for vehicle repair workflow according to some embodiments of the disclosed technology.

FIG. 2 illustrates a process 200 for vehicle repair workflow according to some embodiments of the disclosed technology. The elements of the disclosed processes are presented in a particular order. However, it should be understood that, in various embodiments, one or more elements may be performed in a different order, in parallel, or omitted. Referring to FIG. 2, the process 200 may begin with a vehicle accident, at 202, and may continue with the vehicle owner reporting the accident to an insurance company, and taking the vehicle to a repair facility, at 204. Alternatively, the owner may take the vehicle to a repair facility, at 206, which may report the accident to the insurance company, at 208.

Next, a vehicle damage assessment is performed, at 210. For example, a staff appraiser of an insurance company may visit the damaged vehicle to take photos of the damage. Alternatively, the owner may send photos of the damaged vehicle to the insurance company. Next, the process may include the generation of a vehicle repair estimate, at 212, as described below in detail. Based on the vehicle repair estimate, the repair of the vehicle may take place, at 214. When the repair is complete, the repaired vehicle may be delivered to the vehicle owner, at 216.

Figure 3:
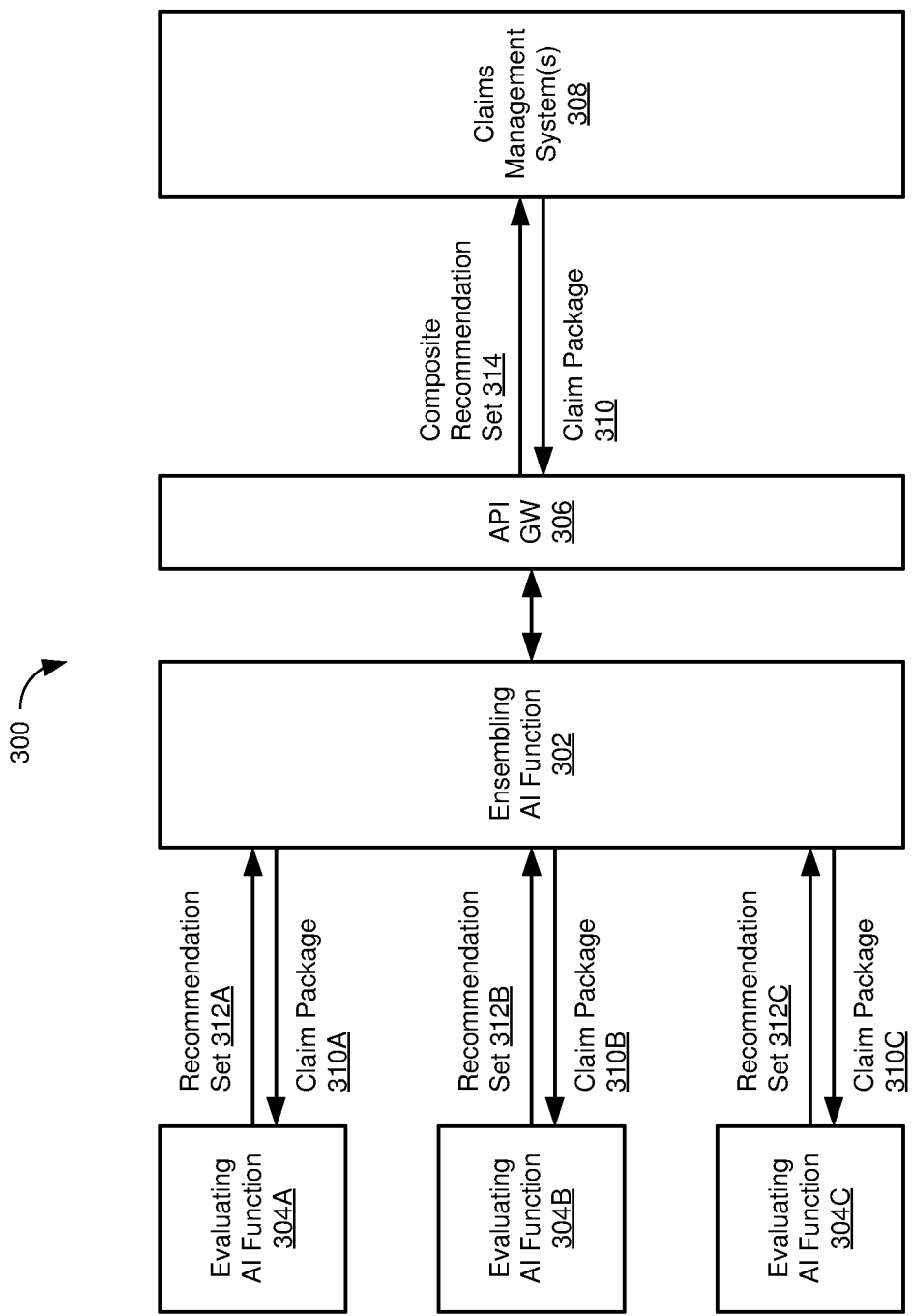
FIG. 3 illustrates a vehicle repair estimate automation system according to some embodiments of the disclosed technology.

FIG. 3 illustrates a vehicle repair estimate automation system 300 according to some embodiments of the disclosed technology. Elements of the system 300 may be implemented within the vehicle repair estimating system 100 of FIG. 1. Referring to FIG. 3, the system 300 may include ensembling AI function 302 and a plurality of evaluating AI functions 304A, B, C. While for clarity of explanation only three evaluating AI functions 304 are shown and discussed, it should be appreciated that any number of evaluating AI functions 304 may be used.

In some embodiments, one or more of the evaluating AI functions 304 may be implemented and/or operated by the same entity that implements and/or operates ensembling AI function 302. In some embodiments, one or more of the evaluating AI functions 304 may be implemented and/or operated by an entity that is different from the entity that implements and/or operates ensembling AI function 302. For example, one or more of the evaluating AI functions 304 may be implemented and/or operated by a third-party vendor or the like. One advantage of this arrangement is that evaluating AI functions may be added and removed as desired.

As noted above, the AI functions 302,304 may be implemented in any manner. The system 300 may include an applications programming interface (API) gateway (GW) 306 to provide an interface between the ensembling AI function 302 and other systems. In the example of FIG. 3, one or more claims management systems 308 may access the ensembling AI function 302 through the API GW 306.

The claims management system 308 may submit a claim package 310 to the ensembling AI function 302. The claim package may include data describing a damaged vehicle.

The data may include images such as photos of the damaged vehicle, video of the damaged vehicle, audio recordings describing the damaged vehicle, text describing the damaged vehicle, and the like.

The ensembling AI function 302 may distribute the claim package 310 to the evaluating AI functions 304. Referring to FIG. 3, the ensembling AI function 302 may distribute claim packages 310A,B,C to the evaluating AI functions 304A,B, C, respectively. In some embodiments, the claim packages 310A,B,C may be the same. In other embodiments, the claim packages 310A,B,C may differ. For example, each of the claim packages 310A,B,C may be a different subset of the claim package 310.

Referring to FIG. 3, the evaluating AI functions 304A,B,C may generate recommendation sets 312A,B,C, respectively. The evaluating AI functions 304 may be implemented in different manners, so that when given the same claim package 310, the evaluating AI functions 304 may generate different recommendation sets 312.

A recommendation set 312 may identify at least one recommended vehicle repair operation, of a plurality of the vehicle repair operations, for the damaged vehicle. For example, a recommended vehicle repair operation may indicate that a front bumper of the vehicle should be replaced. A recommendation set 312 may identify a score for a recommended vehicle repair operation. Each score may be a floating-point value that indicates a projected accuracy of the recommended vehicle repair operation, with higher floating-point values indicating greater projected accuracy. A recommendation set 312 may include metadata objects of the damaged vehicle, for example including one or more of the images, in the corresponding claim package 310. In some instances, in addition to scores, a mathematical and/or statistical confidence percentage may also be included to indicate confidence around AI inferred accuracy of each recommended operation. Higher confidence percentages for an AI decision may indicate higher confidence in the AI decision.

The ensembling AI function 302 may generate a composite recommendation set 314 based on the recommendation sets 312 generated by the evaluating AI functions 304, as described in detail below. The composite recommendation set 314 may identify at least one recommended vehicle repair operation, a score for a recommended vehicle repair operation, one or more of the images in the corresponding claim package 310, and the like. The ensembling AI function 302 may provide the composite recommendation set 314 to one or more claims management systems 308.

Figure 4:
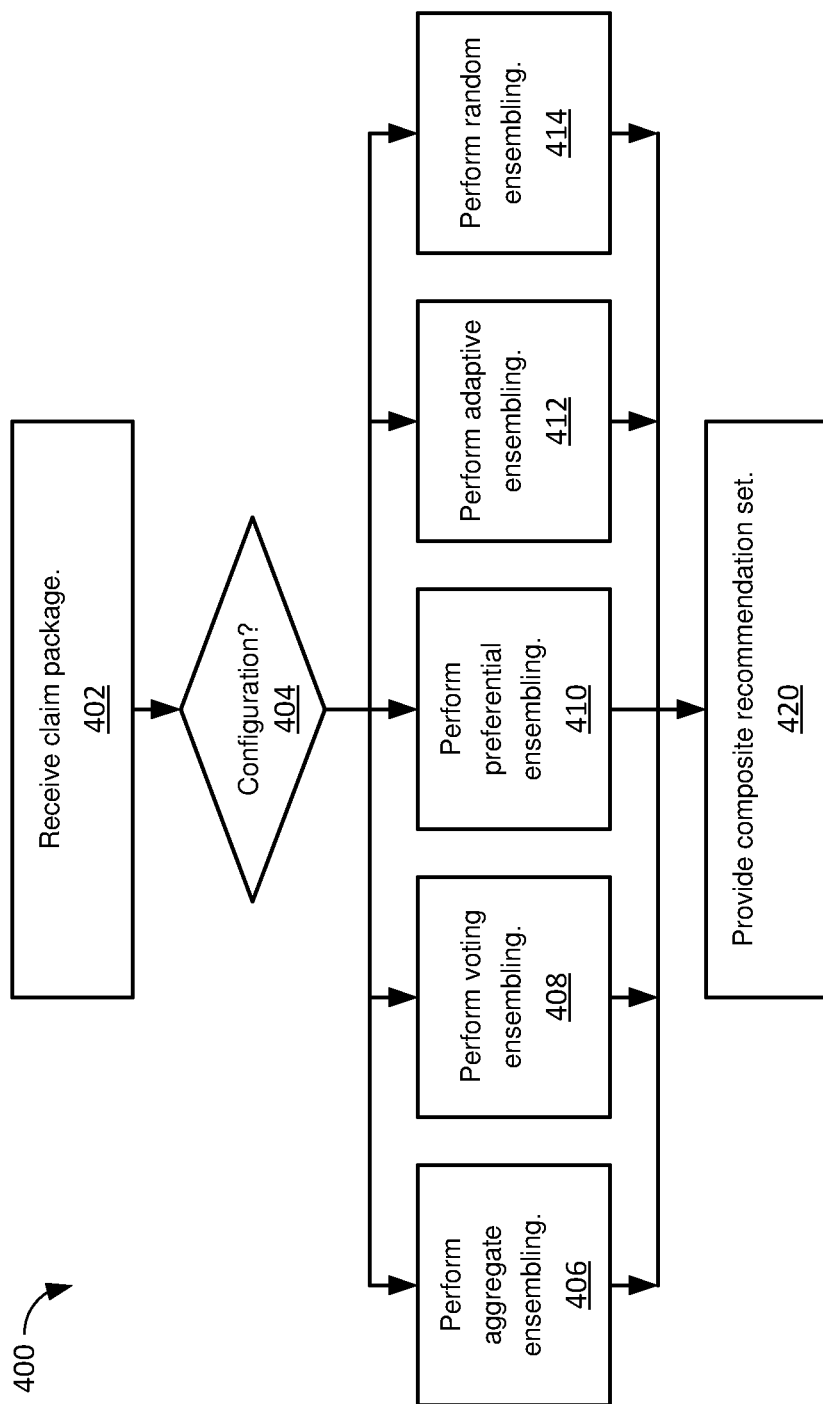
FIG. 4 illustrates a vehicle repair estimate automation process according to some embodiments of the disclosed technology.

FIG. 4 illustrates a vehicle repair estimate automation process 400 according to some embodiments of the disclosed technology. The process 400 may be performed, for example, by the vehicle repair estimating systems 100 and 300 of FIGS. 1 and 3. Referring to FIG. 4, the process 400 may include receiving a claim package, at 402. In the example of FIG. 3, the ensembling AI function 302 may receive a claim package 310 from one or more claims management systems 308 through the API GW 306.

Referring again to FIG. 4, the process 400 may include determining a configuration of the vehicle repair estimate automation process 400, at 404. In some embodiments, the process 400 may be configured to employ one or more ensembling techniques. In the example of FIG. 4, the ensembling techniques may include aggregate ensembling, at 406, voting ensembling, at 408, preferential ensembling, at 410, adaptive ensembling, at 412, and random ensembling, at 414. In the example of FIG. 3, the ensembling techniques may be performed by the ensembling AI function 302 in conjunction with the evaluating AI functions 304. Each of these techniques is described in detail below.

Referring again to FIG. 4, the process 400 may include providing the resulting composite recommendation set, at 420. In the example of FIG. 3, the ensembling AI function 302 may provide the composite recommendation set 314 to one or more claims management systems 308 through the API GW 306.

Figure 5:
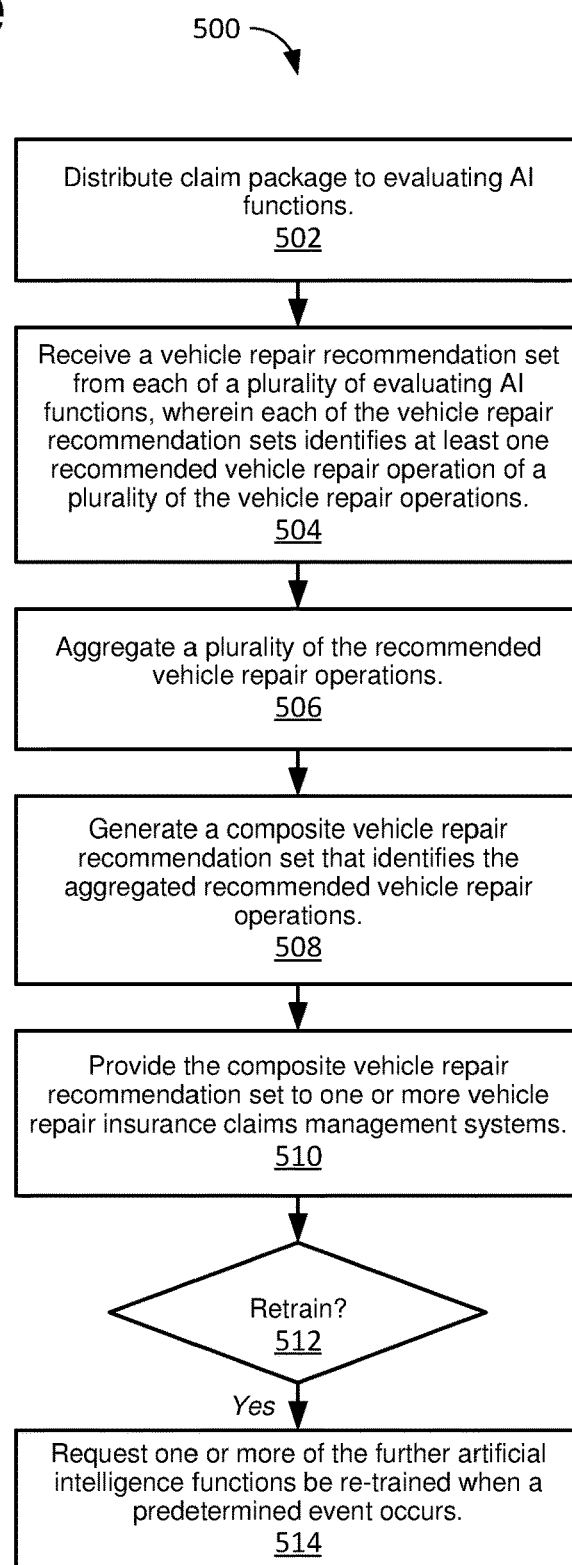
FIG. 5 illustrates an aggregate ensembling process according to some embodiments of the disclosed technology.

FIG. 5 illustrates an aggregate ensembling process 500 according to some embodiments of the disclosed technology. The process 500 may be performed, for example, by the vehicle repair estimating systems 100 and 300 of FIGS. 1 and 3. Referring to FIG. 5, the process 500 may include distributing the claim package to the evaluating AI functions, at 502. In the example of FIG. 3, ensembling AI function 302 may distribute claim packages 310A,B,C to the evaluating AI functions 304A,B,C, respectively.

Referring again to FIG. 5, the process 500 may include receiving a vehicle repair recommendation set from the evaluating AI functions, wherein each of the vehicle repair recommendation sets identifies at least one recommended vehicle repair operation of a plurality of the vehicle repair operations, at 504. In the example of FIG. 3, ensembling AI function 302 may receive recommendation sets 312A,B,C from the evaluating AI functions 304A,B,C, respectively.

Referring again to FIG. 5, the process 500 may include aggregating a plurality of the recommended vehicle repair operations, at 506. In the example of FIG. 3, the ensembling AI function 302 may aggregate the received recommendation sets 312. In some embodiments, aggregating the received recommendation sets 312 may include combining two or more of the received recommendation sets 312. In some embodiments, redundant recommended vehicle repair operations may be omitted from the resulting combination. Other aggregation techniques are contemplated as well.

Referring again to FIG. 5, the process 500 may include generating a composite vehicle repair recommendation set that identifies the aggregated recommended vehicle repair operations, at 508. In the example of FIG. 3, the ensembling AI function 302 may aggregate the received recommendation sets to form the composite vehicle repair recommendation set 314.

Referring again to FIG. 5, the process 500 may include providing the composite vehicle repair recommendation set to one or more vehicle repair insurance claims management systems, at 510. In the example of FIG. 3, the ensembling AI function 302 may provide the composite recommendation set 314 to one or more claims management systems 308.

In some embodiments, one or more of the evaluating AI functions 304 may include one or more trained AI functions. For example, an AI function may be implemented as a trained computer vision machine learning model. The machine learning model may be trained, for example, with images of other damaged vehicles and the corresponding vehicle repair operations applied to repair those vehicles. In these embodiments, a trained AI function may be retrained occasionally, for example when a predetermined retraining trigger event occurs. A retraining trigger event may be a function a defined lapsed period of time (say, every six months, for example), a result of a comparison between a pre-defined evaluation metric of an AI function and a sample hold out (also known as test data set), and may consider factors such as measuring precision, recall and F1 score (accuracy). When an evaluation metric falls below a certain predefined metric, retraining can be automatically retriggered prior to a lapse of a predefined period. For example, the ensembling AI function 302 may compare the components of the recommendation sets received from an evaluating AI function against predetermined benchmarks, and based on the comparison, may declare a retraining trigger event.

Referring again to FIG. 5, the process 500 may include determining whether a predetermined retraining trigger event has occurred, at 512. The process 500 may include requesting one or more of the evaluating artificial intelligence functions be re-trained when a predetermined event occurs, at 514. In the example of FIG. 3, the ensembling AI function 302 may determine whether a predetermined retraining trigger event has occurred, and may request one or more of the evaluating artificial intelligence functions 304 be re-trained when the predetermined event occurs.

Figure 6:
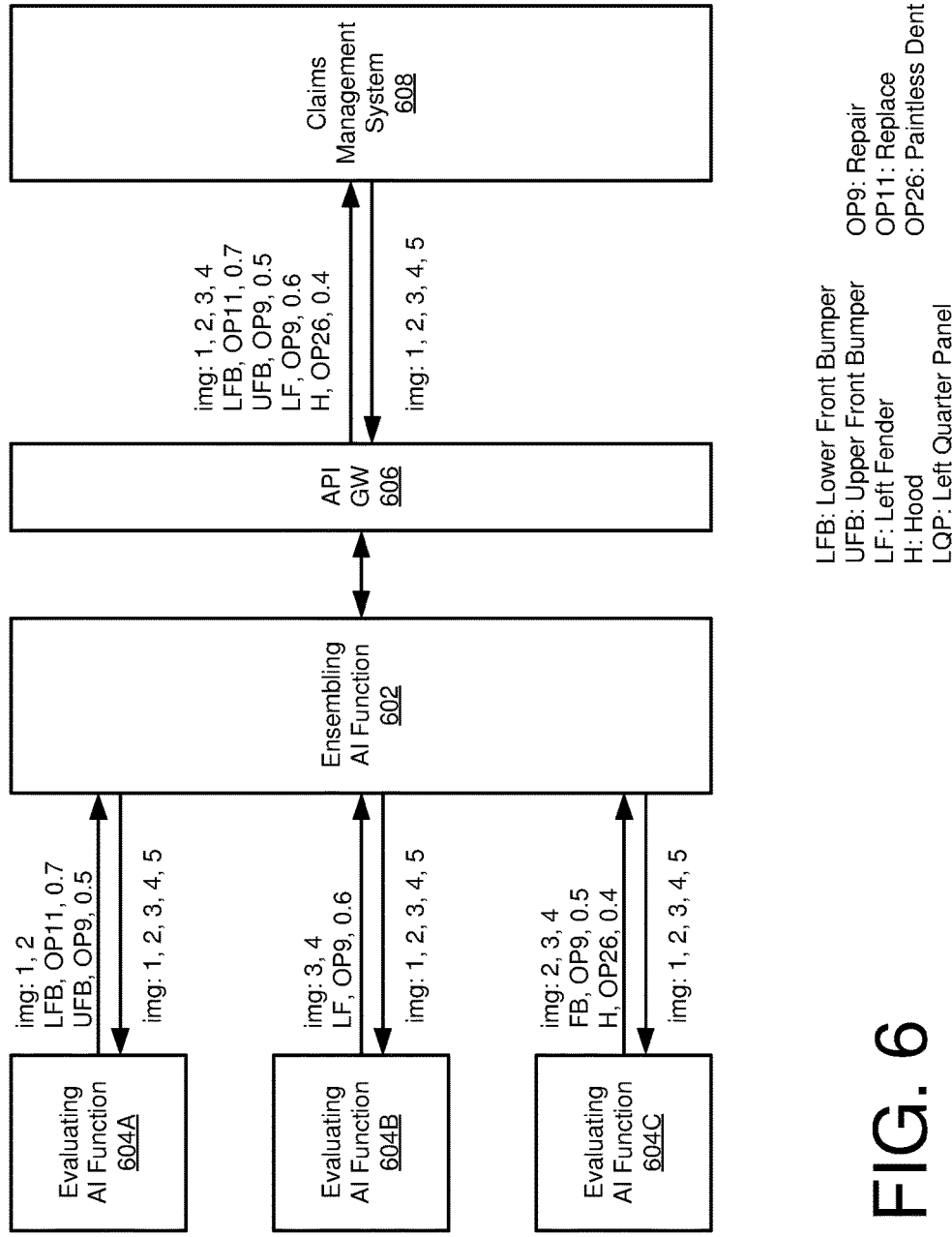
FIG. 6 illustrates an example operation according to the aggregate ensembling process of FIG. 5.

FIG. 6 illustrates an example operation 600 according to the aggregate ensembling process 500 of FIG. 5. Referring to FIG. 6, the ensembling AI function 602 receives a claim package from a claims management system 608 via an API GW 606. For clarity, only the images in the claim package are discussed. However, it should be appreciated that the claim package may contain other data objects in addition to, or instead of, the images, and that those data objects may be treated in a similar manner.

The claim package example illustrated includes five images 1,2,3,4,5 of a damaged vehicle. The ensembling AI function 602 distributes the images to the evaluating AI functions 604. In this example, the ensembling AI function 602 distributes all of the images to each of the evaluating AI functions 604. The evaluating AI functions 604 process the images.

Each of the evaluating AI functions 604 returns a different recommendation set. The evaluating AI function 604A returns a recommendation set that includes images 1,2 and two recommended operations with components and scores. The legend in FIG. 6 indicates identifiers for components and operations. One of the recommended operations is LFB, OP11, 0.7, which indicates replacement of the Lower Front Bumper with a score of 0.7. The other recommended operation is UFB, OP9, 0.5, which indicates repair of the Upper Front Bumper with a score of 0.5. But while the examples presented herein describe AI function inferencing outcome examples such as component, labor operation, associated score, and the like, it should be understood that additional AI outcomes may include other factors, for example such as repair labor hours, type of damage, area of damage, and the like.

The evaluating AI function 604B returns a recommendation set that includes images 3,4 and one recommended operation with component and score. The recommended operation is LF, OP9, 0.6, which indicates repair of the Left Fender with a score of 0.6.

The evaluating AI function 604C returns a recommendation set that includes images 2,3,4 and two recommended operations with components and scores. One of the recommended operations is FB, OP9, 0.5, which indicates repair of the front bumper with a score of 0.5. The other recommended operation is H, OP26, 0.4, which indicates painless dent repair of the hood with a score of 0.4.

The ensembling AI function 602 may aggregate these recommendation sets to form the composite vehicle repair recommendation set. In this example, the composite recommendation set includes a union of the images in the recommendation sets provided by the evaluating AI functions 604, namely images 1,2,3,4. The composite recommendation set also includes a union of the recommended operations and scores in the recommendation sets provided by the evaluating AI functions 604.

In some embodiments, the ensembling AI function 602 prefers granularity. As used herein, the term "granularity" may pertain to various minor parts of the vehicle that an AI function can identify, rather than major panels or sub-panels/components. In the example of FIG. 6, the evaluating AI function 604A has provided two recommended operations for the front bumper (LFB and UFB), while the evaluating AI function 604C has provided only one (FB). Therefore the ensembling AI function 602 includes the two recommended operations for the front bumper (LFB and UFB), while omitting the single recommendation (FB).

The ensembling AI function 602 provides the composite recommendation set to the claims management systems 608.

Figure 7:
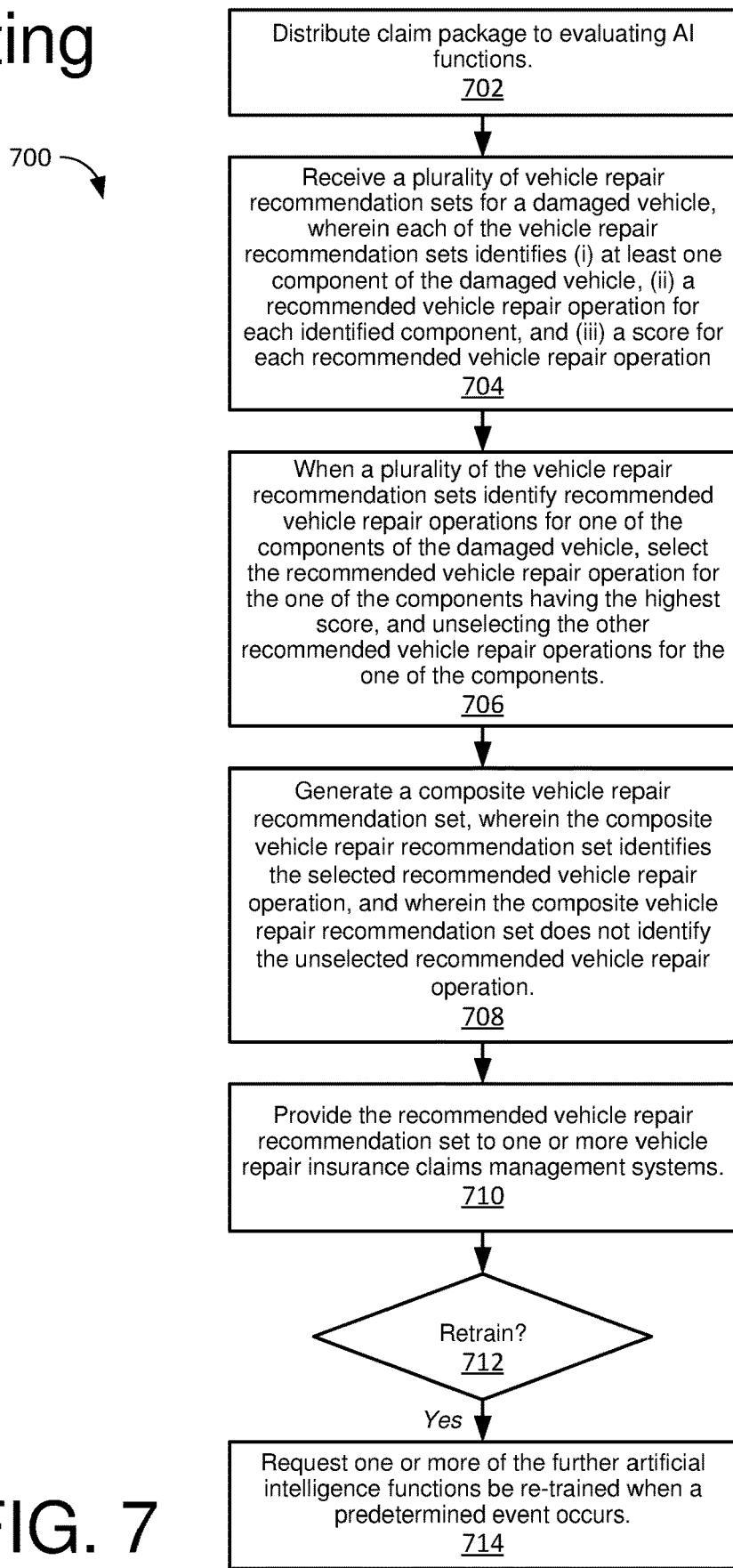
FIG. 7 illustrates a voting ensembling process according to some embodiments of the disclosed technology.

FIG. 7 illustrates a voting ensembling process 700 according to some embodiments of the disclosed technology. The process 700 may be performed, for example, by the vehicle repair estimating systems 100 and 300 of FIGS. 1 and 3. Referring to FIG. 7, the process 700 may include distributing the claim package to the evaluating AI functions, at 702. In the example of FIG. 3, ensembling AI function 302 may distribute claim packages 310A,B,C to the evaluating AI functions 304A,B,C, respectively.

Referring again to FIG. 7, the process 700 may include receiving a plurality of vehicle repair recommendation sets for a damaged vehicle, wherein each of the vehicle repair recommendation sets identifies (i) at least one component of the damaged vehicle, (ii) a recommended vehicle repair operation for each identified component, and (iii) a score for each recommended vehicle repair operation, at 704. The vehicle repair recommendation sets may include other recommended operations such as repair labor hours, area of damage, type of damage, and the like. In the example of FIG. 3, each of the recommendation sets 312 generated by the evaluating AI functions 304 may include one or more recommended vehicle repair operations. In addition, each of the recommendation sets 312 may be associated with a component of the damaged vehicle, and may have a score.

Referring again to FIG. 7, the process 700 may include, when a plurality of the vehicle repair recommendation sets identify recommended vehicle repair operations for one of the components of the damaged vehicle, selecting the recommended vehicle repair operation for the one of the components having the highest score or highest confidence percentage, and unselecting the other recommended vehicle repair operations for the one of the components, at 706. In the example of FIG. 3, when multiple recommendation sets 312 include a recommended vehicle repair operation, the ensembling AI function 302 may select the recommended vehicle repair operation having the highest score or highest confidence percentage, and unselect the recommended vehicle repair operation(s) having lower scores.

Referring again to FIG. 7, the process 700 may include generating a composite vehicle repair recommendation set, wherein the composite vehicle repair recommendation set identifies the selected recommended vehicle repair operation, and wherein the composite vehicle repair recommendation set does not identify the unselected recommended vehicle repair operation, at 708. In the example of FIG. 3, the ensembling AI function 302 may include, in the composite vehicle repair recommendation set 314, all of the recommended vehicle repair operations from the recommendation sets 312, except the unselected recommended vehicle repair operation(s).

Referring again to FIG. 7, the process 700 may include providing the composite vehicle repair recommendation set to one or more vehicle repair insurance claims management systems, at 710. In the example of FIG. 3, the ensembling AI function 302 may provide the composite recommendation set 314 to one or more claims management systems 308.

Referring again to FIG. 7, the process 700 may include determining whether a predetermined retraining trigger event has occurred, at 712. The process 700 may include requesting one or more of the evaluating artificial intelligence functions be re-trained when a predetermined event occurs, at 714. In the example of FIG. 3, the ensembling AI function 302 may determine whether a predetermined retraining trigger event has occurred, and may request one or more of the evaluating artificial intelligence functions 304 be re-trained when the predetermined event occurs. A retraining trigger event may be as described above.

Figure 8:
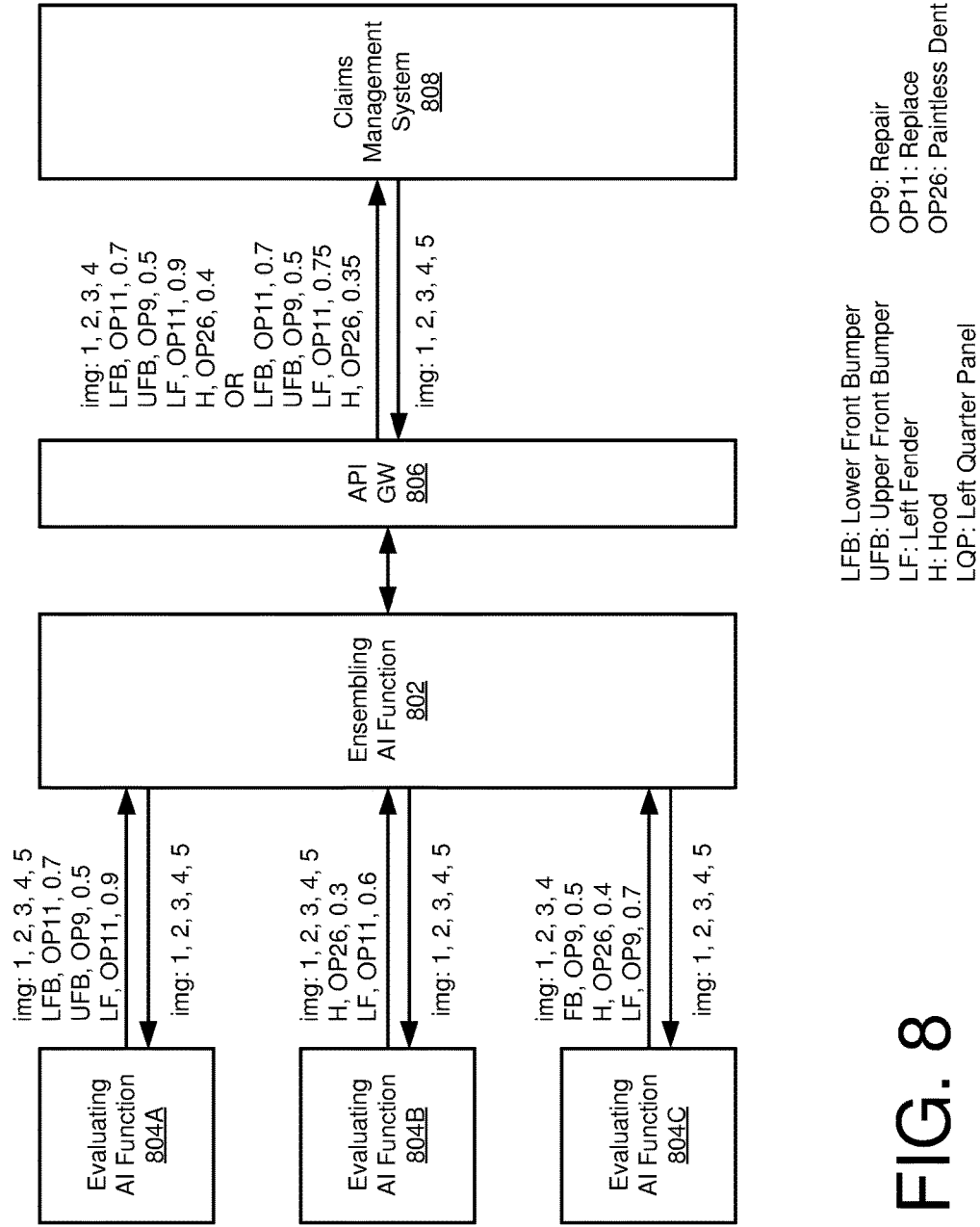
FIG. 8 illustrates an example operation according to the voting ensembling process of FIG. 7.

FIG. 8 illustrates an example operation 800 according to the voting ensembling process 700 of FIG. 7. Referring to FIG. 8, the ensembling AI function 802 receives a claim package from a claims management system 808 via an API GW 806. For clarity, only the images in the claim package are discussed. However, it should be appreciated that the claim package may contain other data objects in addition to, or instead of, the images, and that those data objects may be treated in a similar manner.

The claim package includes five images 1,2,3,4,5 of a damaged vehicle. The ensembling AI function 802 distributes the images to the evaluating AI functions 804. In this example, the ensembling AI function 802 distributes all of the images to each of the evaluating AI functions 804. The evaluating AI functions 804 process the images.

Each of the evaluating AI functions 804 returns a different recommendation set. The evaluating AI function 804A returns a recommendation set that includes images 1,2,3,4,5 and three recommended operations with components and scores. The legend in FIG. 8 indicates identifiers for components and operations. One of the recommended operations is LFB, OP11, 0.7, which indicates replacement of the lower front bumper with a score of 0.7. Another recommended operation is UFB, OP9, 0.5, which indicates repair of the upper front bumper with a score of 0.5. A third recommendation is LF, OP11, 0.9, which indicates replacement of the left fender.

The evaluating AI function 804B returns a recommendation set that includes images 1,2,3,4,5 and two recommended operations with components and scores. One recommended operation is H, OP26, 0.3, which indicates a paintless dent repair for hood. Another recommended operation is LF, OP11, 0.6, which indicates replacement of the left fender with a score of 0.6.

The evaluating AI function 804C returns a recommendation set that includes images 1,2,3,4 and three recommended operations with components and scores. One of the recommended operations is FB, OP9, 0.5, which indicates repair of the front bumper with a score of 0.5. Another recommended operation is H, OP26, 0.4, which indicates paintless dent repair of the hood with a score of 0.4. Another recommended operation is LF, OP9, 0.7, which indicates a repair of the left fender.

In the example of FIG. 8, two of the recommendation sets include a recommended repair operation for the hood. Therefore, the ensembling AI function 802 selects the recommended repair operation for the hood having the higher score, and unselects the other. That is, the ensembling AI function 802 selects the recommendation operation H, OP26, 0.4, returned by the evaluating AI function 804C, and unselects the recommended operation H, OP11, 0.3 returned by the evaluating AI function 804C.

In the example of FIG. 8, all three of the recommendation sets include a recommended operation for the left fender. Therefore, the ensembling AI function 802 selects the recommended repair operation for the left fender having the highest score, and unselects the other two. That is, the ensembling AI function 802 selects the recommendation operation LF, OP11, 0.9 returned by the evaluating AI function 804A, and unselects the recommended operation LF, OP11, 0.6 returned by the evaluating AI function 804B, and unselects the recommended operation LF, OP9, 0.7 returned by the evaluating AI function 804C.

In some embodiments, the ensembling AI function 802 identifies the score of each selected operation in the composite recommendation set, as shown in FIG. 8. In other embodiments, the ensembling AI function 802 combines the score of each selected operation with the scores of the corresponding unselected operation(s). Any technique of combining the scores may be used. For example, the scores may be averaged. In the example of FIG. 8, the scores for the hood operation may be averages so that the operation H, OP26, 0.35 is provided in the composite recommendation set. In the example of FIG. 8, there are two unselected operations for the left fender, but only one has the same operation code (OP11) as the selected operation. Therefore only the scores for that operation (OP11) are averaged, so that the operation LF, OP11, 0.75 is provided in the composite recommendation set.

The disclosed voting ensembling techniques provides several advantages. One advantage is that this approach exploits the scores to provide more accurate estimates.

Figure 9:
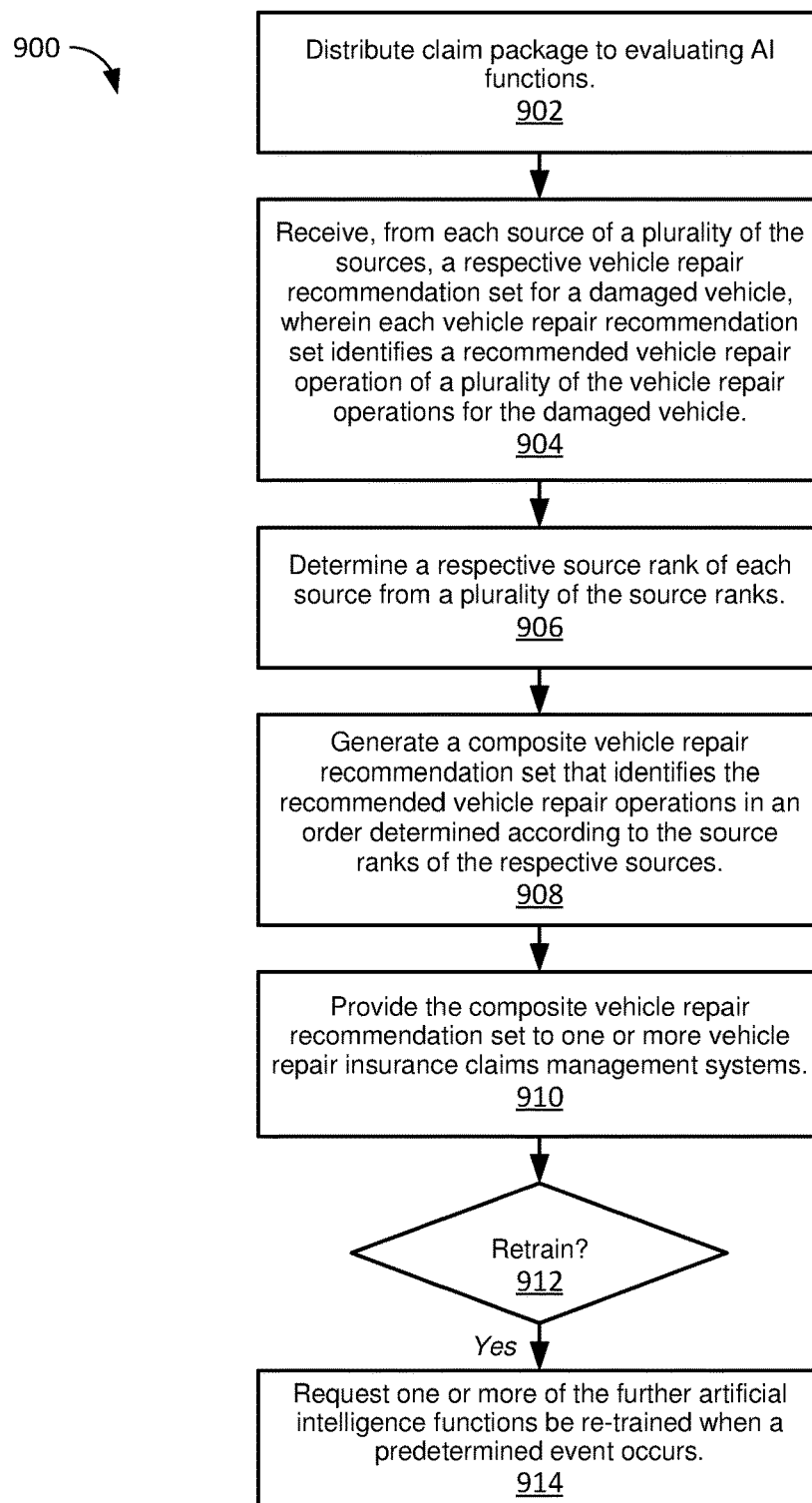
FIG. 9 illustrates a preferential ensembling process according to some embodiments of the disclosed technology.

FIG. 9 illustrates a preferential ensembling process 900 according to some embodiments of the disclosed technology. The process 900 may be performed, for example, by the vehicle repair estimating systems 100 and 300 of FIGS. 1 and 3. Referring to FIG. 9, the process 900 may include distributing the claim package to the evaluating AI functions, at 902. In the example of FIG. 3, ensembling AI function 302 may distribute claim packages 310A,B,C to the evaluating AI functions 304A,B,C, respectively.

Referring again to FIG. 9, the process 900 may include receiving, from each source of a plurality of the sources, a respective vehicle repair recommendation set for a damaged vehicle, wherein each vehicle repair recommendation set identifies a recommended vehicle repair operation of a plurality of the vehicle repair operations for the damaged vehicle, at 904. In the example of FIG. 3, the ensembling AI function 302 may receive recommendation sets 312A,B,C from three sources, namely the evaluating AI functions 304A,B,C, respectively.

Referring again to FIG. 9, the process 900 may include determining a respective source rank of each source from a plurality of the source ranks, at 906. In the example of FIG. 3, the evaluating AI functions 304 may be ranked. The ranks may be set, for example, by the claims management system in accordance with preferences for the evaluating AI functions 304.

Referring again to FIG. 9, the process 900 may include generating a composite vehicle repair recommendation set that identifies the recommended vehicle repair operations in an order determined according to the source ranks of the respective sources, at 908. In the example of FIG. 3, the ensembling AI function 302 may include, in the composite vehicle repair recommendation set 314, the recommended vehicle repair operations generated by the evaluating AI functions 304 having the highest rank, as well as those generated by one or more other evaluating AI functions, in rank order.

Referring again to FIG. 9, the process 900 may include providing the composite vehicle repair recommendation set to one or more vehicle repair insurance claims management systems, at 910. In the example of FIG. 3, the ensembling AI function 302 may provide the composite recommendation set 314 to one or more claims management systems 308.

Referring again to FIG. 9, the process 900 may include determining whether a predetermined retraining trigger event has occurred, at 912. The process 900 may include requesting one or more of the evaluating artificial intelligence functions be re-trained when a predetermined event occurs, at 914. In the example of FIG. 3, the ensembling AI function 302 may determine whether a predetermined retraining trigger event has occurred, and may request one or more of the evaluating artificial intelligence functions 304 be re-trained when the predetermined event occurs.

Figure 10:
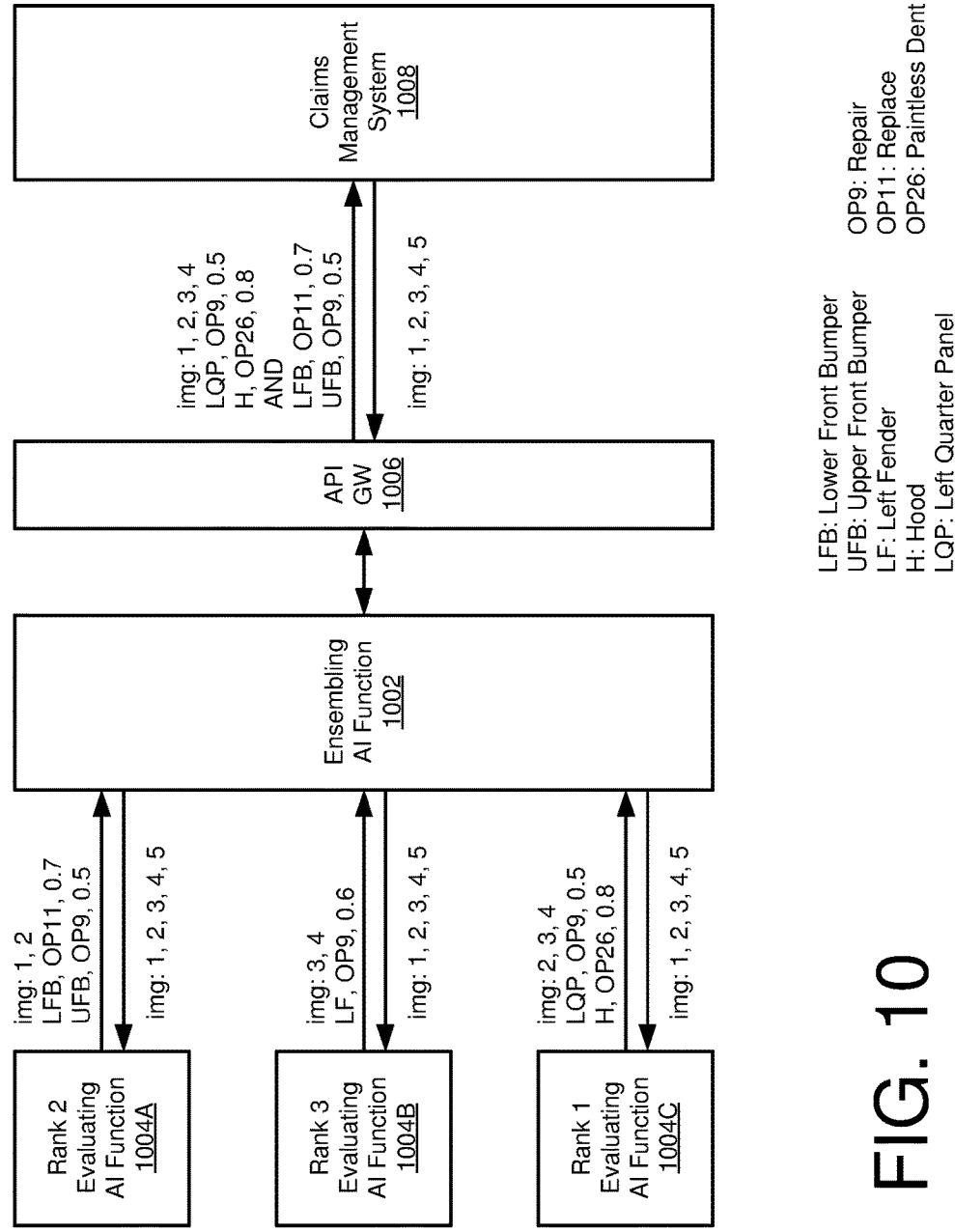
FIG. 10 illustrates an example operation according to the preferential ensembling process of FIG. 9.

FIG. 10 illustrates an example operation 1000 according to the preferential ensembling process 900 of FIG. 9. Referring to FIG. 10, the ensembling AI function 1002 receives a claim package from a claims management system 1008 via an API GW 1006. For clarity, only the images in the claim package are discussed. However, it should be appreciated that the claim package may contain other data objects in addition to, or instead of, the images, and that those data objects may be treated in a similar manner.

The claim package includes five images 1,2,3,4,5 of a damaged vehicle. The ensembling AI function 1002 distributes the images to the evaluating AI functions 1004. In this example, the ensembling AI function 1002 distributes all of the images to each of the evaluating AI functions 1004. The evaluating AI functions 1004 process the images.

Each of the evaluating AI functions 1004 returns a different recommendation set. The evaluating AI function 1004A returns a recommendation set that includes images 1,2 and two recommended operations with components and scores. The legend in FIG. 10 indicates identifiers for components and operations. One of the recommended operations is LFB, OP11, 0.7, which indicates replacement of the lower front bumper with a score of 0.7. Another recommended operation is UFB, OP9, 0.5, which indicates repair of the upper front bumper with a score of 0.5.

The evaluating AI function 1004B returns a recommendation set that includes images 3,4 and one recommended operation with component and score. The recommended operation is LF, OP9, 0.6, which indicates a repair of the left fender with a score of 0.6.

The evaluating AI function 1004C returns a recommendation set that includes images 2,3,4 and two recommended operations with components and scores. One of the recommended operations is LQP, OP9, 0.5, which indicates repair of the left quarter panel with a score of 0.5. The other recommended operation is H, OP26, 0.8, which indicates paintless dent repair of the hood with a score of 0.8.

As shown in FIG. 10, the evaluating AI functions 1004A, B,C have ranks 2, 3, and 1, respectively. Therefore the ensembling AI function 1002 places the recommended repair operations generated by evaluating AI function 1004C first in the composite recommendation set, and places the recommended repair operations generated by evaluating AI function 1004A second. In some embodiments, the ensembling AI function 1002 may omit the recommended repair operations generated by evaluating AI functions 1004 having lower ranks from the composite recommendation set. In the example of FIG. 8, the recommended repair operations generated by the third-ranked evaluating AI function 1004B have been omitted from the composite recommendation set. In other embodiments, all of the recommended repair operations may be included in the composite recommendation set. In some embodiments, only the recommended repair operations generated by the highest-ranked evaluating AI function 1004C may be included in the composite recommendation set.

The disclosed preferential ensembling techniques provides several advantages. One advantage is that this approach allows the recommended vehicle repair sets in the composite vehicle repair recommendation set to be ranked. These ranks can be set internally, or by external entities, for example such as a claims management system.

Figure 11B:
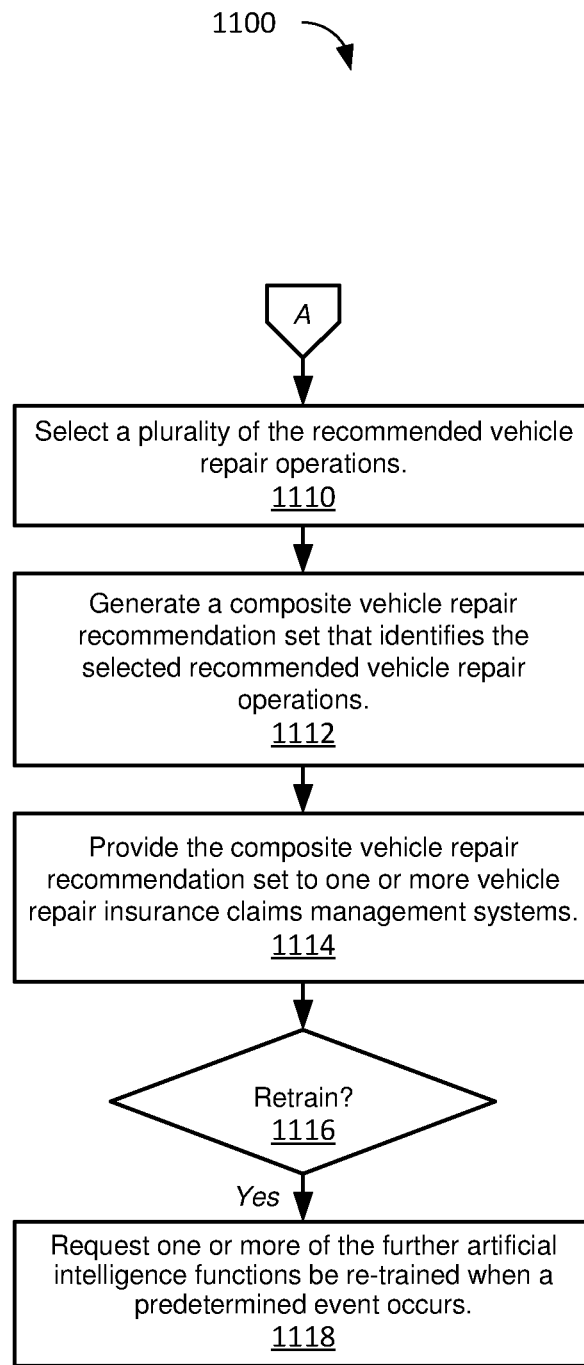
FIGS. 11A,B illustrate a random ensembling process according to some embodiments of the disclosed technology.

FIGS. 11A,B illustrate a random ensembling process 1100 according to some embodiments of the disclosed technology. The process 1100 may be performed, for example, by the vehicle repair estimating systems 100 and 300 of FIGS. 1 and 3. Referring to FIG. 11A, the process 1100 may include receiving a vehicle damage object for a damaged vehicle, wherein the vehicle damage object includes a plurality of images of the damaged vehicle, at 1102. In the example of FIG. 3, the ensembling AI function 302 may receive a claim package 310 containing the vehicle damage object from a claims management system 308.

Referring to FIG. 11A, the process 1100 may include fragmenting the object into a plurality of vehicle damage object fragments, wherein each vehicle damage object fragment includes at least one of the images of the damaged vehicle, at 1104. In some embodiments, the object may be fragmented into vehicle damage object fragments in a random manner. In the example of FIG. 3, the ensembling AI function 302 may fragment the object.

Referring to FIG. 11A, the process 1100 may include providing each of the vehicle damage object fragments to a respective one of a plurality of artificial intelligence functions, at 1106. In the example of FIG. 3, ensembling AI function 302 may provide the vehicle damage object fragments to the evaluating AI functions 304. The ensembling AI function 302 may provide the vehicle damage object fragments to the evaluating AI functions 304 in a random manner. For example, ensembling AI function 302 may generate random associations between the vehicle damage object fragments and the artificial intelligence functions 304, and may provide the vehicle damage object fragments to the artificial intelligence functions 304 according to the generated random associations.

Referring again to FIG. 11A, the process 1100 may include receiving a respective vehicle repair recommendation set from each of the artificial intelligence functions, wherein each vehicle repair recommendation set is based on a respective one of the vehicle damage object fragments, and wherein each of the vehicle repair recommendation sets identifies a recommended vehicle repair operation of a plurality of the vehicle repair operations for the damaged vehicle, 1108. In the example of FIG. 3, the ensembling AI function 302 may receive recommendation sets 312A,B,C from the evaluating AI functions 304A,B,C, respectively.

Referring again to FIG. 11B, the process 1100 may include selecting a plurality of the recommended vehicle repair operations, at 1110. In the example of FIG. 3, the ensembling AI function 302 may select the recommended vehicle repair operations returned by the evaluating AI functions 304. In some embodiments, the ensembling AI function 302 may select the recommended vehicle repair operations in a random manner.

Referring again to FIG. 11B, the process 1100 may include generating a composite vehicle repair recommendation set that identifies the selected recommended vehicle repair operations, at 1112. In the example of FIG. 3, the ensembling AI function 302 may include the selected recommended vehicle repair operations in the composite vehicle repair recommendation set 314.

Referring again to FIG. 11B, the process 1100 may include providing the composite vehicle repair recommendation set to one or more vehicle repair insurance claims management systems, at 1114. In the example of FIG. 3, the ensembling AI function 302 may provide the composite recommendation set 314 to one or more claims management systems 308.

Referring again to FIG. 11B, the process 1100 may include determining whether a predetermined retraining trigger event has occurred, at 1116. The process 1100 may include requesting one or more of the evaluating artificial intelligence functions be re-trained when a predetermined event occurs, at 1118. In the example of FIG. 3, the ensembling AI function 302 may determine whether a predetermined retraining trigger event has occurred, and may request one or more of the evaluating artificial intelligence functions 304 be re-trained when the predetermined event occurs.

Figure 12:
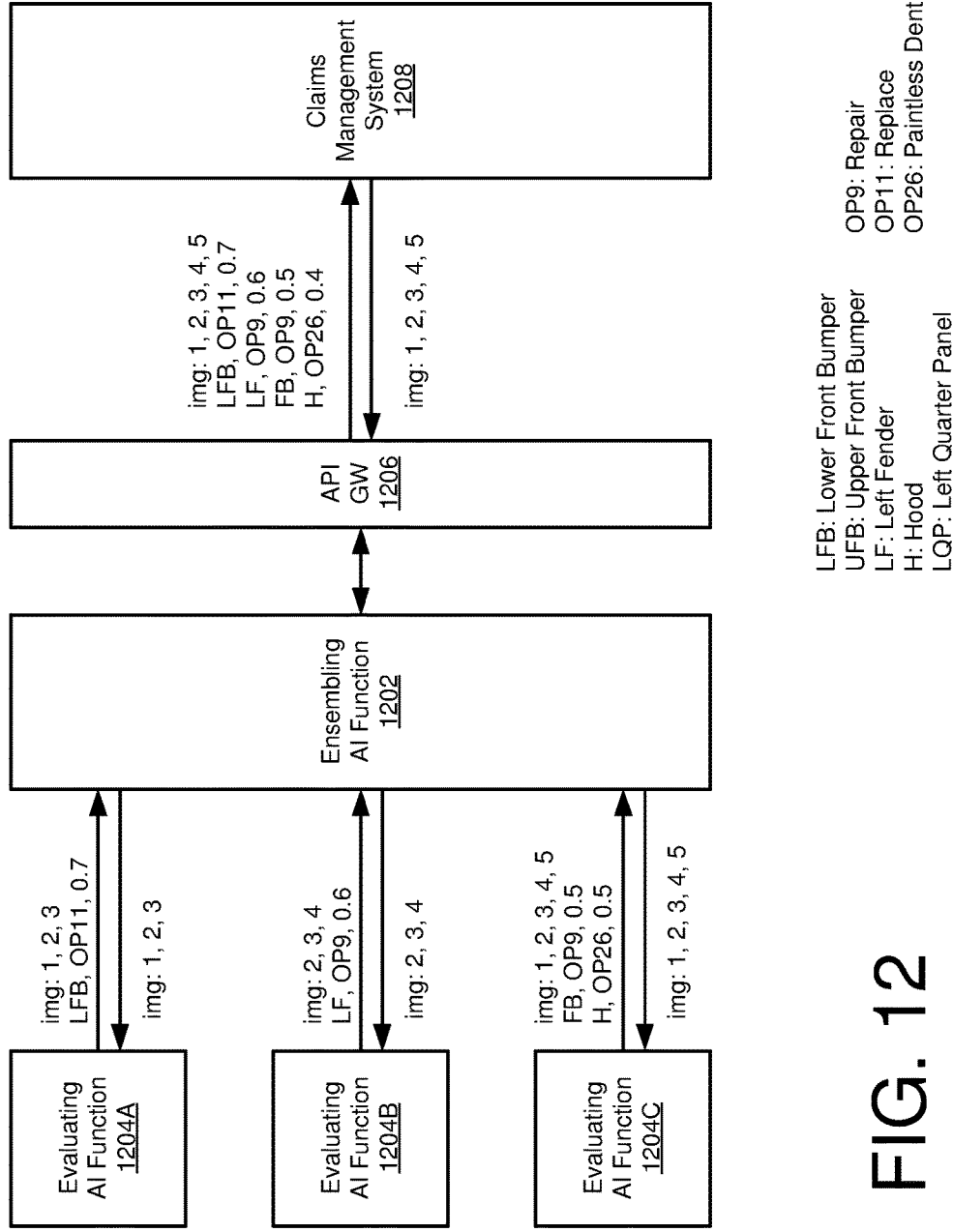
FIG. 12 illustrates an example operation according to the random ensembling process of FIG. 11.

FIG. 12 illustrates an example operation 1200 according to the random ensembling process 1100 of FIG. 11. Referring to FIG. 12, the ensembling AI function 1202 receives a claim package from a claims management system 1208 via an API GW 1206. For clarity, only the images in the claim package are discussed. However, it should be appreciated that the claim package may contain other data objects in addition to, or instead of, the images, and that those data objects may be treated in a similar manner.

The claim package includes five images 1,2,3,4,5 of a damaged vehicle. The ensembling AI function 1202 distributes the images to the evaluating AI functions 1204. In this example, the ensembling AI function 1202 distributes the images to the evaluating AI functions 1204 in a random manner. Referring to FIG. 12, the ensembling AI function 1202 distributes images 1,2,3 to the evaluating AI function 1204A; distributes images 2,3,4 to the evaluating AI function 1204B; and distributes images 1,2,3,4,5 to the evaluating AI function 1204C. The evaluating AI functions 1204 process the images.

Each of the evaluating AI functions 1204 returns a different recommendation set. The evaluating AI function 1204A returns a recommendation set that includes images 1,2,3 and one recommended operation with component and score. The legend in FIG. 12 indicates identifiers for components and operations. The recommended operation is LFB, OP11, 0.7, which indicates replacement of the lower front bumper with a score of 0.7.

The evaluating AI function 1204B returns a recommendation set that includes images 2,3,4 and one recommended operation with component and score. The recommended operation is LF, OP9, 0.6, which indicates a repair of the left fender with a score of 0.6.

The evaluating AI function 1204C returns a recommendation set that includes images 1,2,3,4,5 and two recommended operations with components and scores. One of the recommended operations is FB, OP9, 0.5, which indicates repair of the front bumper with a score of 0.5. The other recommended operation is H, OP26, 0.5, which indicates paintless dent repair of the hood with a score of 0.5.

The ensembling AI function 1202 may aggregate these recommendation sets to form the composite vehicle repair recommendation set. In this example, the composite recommendation set includes a union of the images in the recommendation sets provided by the evaluating AI functions 1204, namely images 1,2,3,4,5. The composite recommendation set also includes a union of the recommended operations and scores in the recommendation sets provided by the evaluating AI functions 1204.

The disclosed random ensembling techniques provides several advantages. One or more of the evaluating AI functions 1204 may feature some form of bias. For example, one or more of the evaluating AI functions 1204 may prefer repair operations to replacement operations. This bias may be inherent, may be learned over time, or the like. Using the described random techniques helps to mitigate these biases.

Figure 13A:
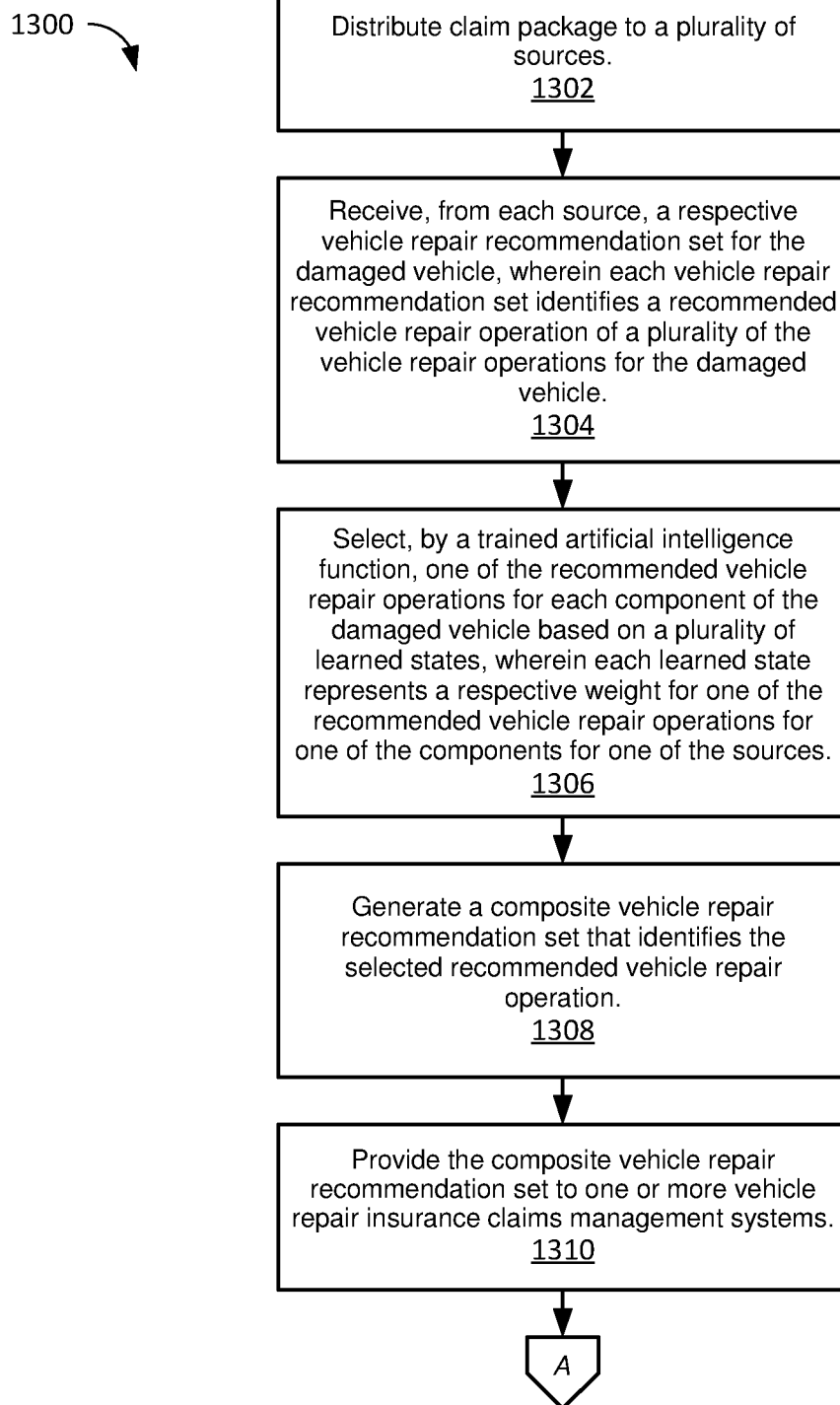
FIGS. 13A,B illustrate an adaptive ensembling process according to some embodiments of the disclosed technology.

FIGS. 13A,B illustrate an adaptive ensembling process 1300 according to some embodiments of the disclosed technology. The process 1300 may be performed, for example, by the vehicle repair estimating systems 100 and 300 of FIGS. 1 and 3. Referring to FIG. 13A, the process 1300 may include distributing the claim package to a plurality of sources, at 1302. In the example of FIG. 3, ensembling AI function 302 may distribute claim packages 310A,B,C to three sources, namely the evaluating AI functions 304A,B,C.

Referring again to FIG. 13A, the process 1300 may include receiving, from each source of the sources, a respective vehicle repair recommendation set for the damaged vehicle, wherein each vehicle repair recommendation set identifies a recommended vehicle repair operation of a plurality of the vehicle repair operations for the damaged vehicle, at 1304. In the example of FIG. 3, the ensembling AI function 302 may receive recommendation sets 312A,B,C from three sources, namely the evaluating AI functions 304A,B,C, respectively.

Referring again to FIG. 13A, the process 1300 may include selecting, by a trained artificial intelligence function, one of the recommended vehicle repair operations for each component of the damaged vehicle based on a plurality of learned states, at 1306. In the example of FIG. 3, the ensembling AI function 302 may select the recommended vehicle repair operations returned by the evaluating AI functions 304 based on the learned states. In some embodiments, the learned states are weights, and each of the evaluating AI functions 304 has a respective weight for each recommended vehicle repair operation for each component.

Referring again to FIG. 13A, the process 1300 may include generating a composite vehicle repair recommendation set that identifies the selected recommended vehicle repair operation, 1308. In the example of FIG. 3, the ensembling AI function 302 may include one or more selected recommended vehicle repair operations in the composite vehicle repair recommendation set 314.

Referring again to FIG. 13A, the process 1300 may include providing the composite vehicle repair recommendation set to one or more vehicle repair insurance claims management systems, at 1310. In the example of FIG. 3, the ensembling AI function 302 may provide the composite recommendation set 314 to one or more claims management systems 308.

Figure 13B:
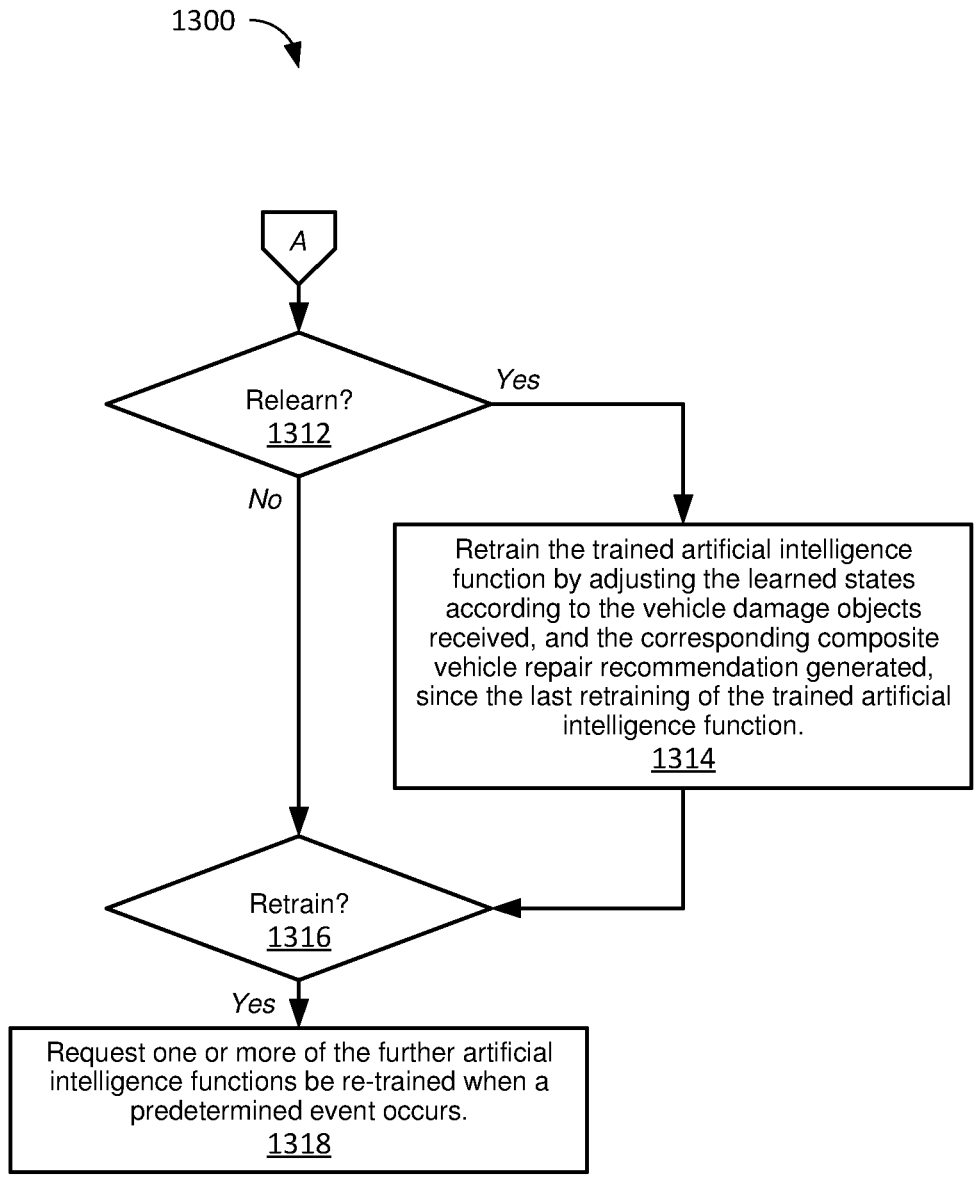

Referring again to FIG. 13B, the process 1300 may include determining whether the learned states should be adjusted, at 1312. Any technique may be used to make this determination. For example, the learned states may be adjusted periodically. As another example, the composite vehicle repair recommendation sets may be compared to baselines, ground truths, and the like. The process 1300 may include retraining the trained artificial intelligence function by adjusting the learned states according to the vehicle damage objects received, and the corresponding composite vehicle repair recommendation generated, since the last retraining of the trained artificial intelligence function, at 1314. In the example of FIG. 3, the ensembling AI function 302 may determine whether the learned states should be adjusted, and when it is determined the learned states should be adjusted, may retrain using the corresponding sets of vehicle damage objects received, and composite vehicle repair recommendation sets generated, since the last retraining.

Referring again to FIG. 13B, the process 1300 may include determining whether a predetermined retraining trigger event has occurred, at 1316. The process 1300 may include requesting one or more of the evaluating artificial intelligence functions be re-trained when a predetermined event occurs, at 1318. In the example of FIG. 3, the ensembling AI function 302 may determine whether a predetermined retraining trigger event has occurred, and may request one or more of the evaluating artificial intelligence functions 304 be re-trained when the predetermined event occurs.

Figure 14:
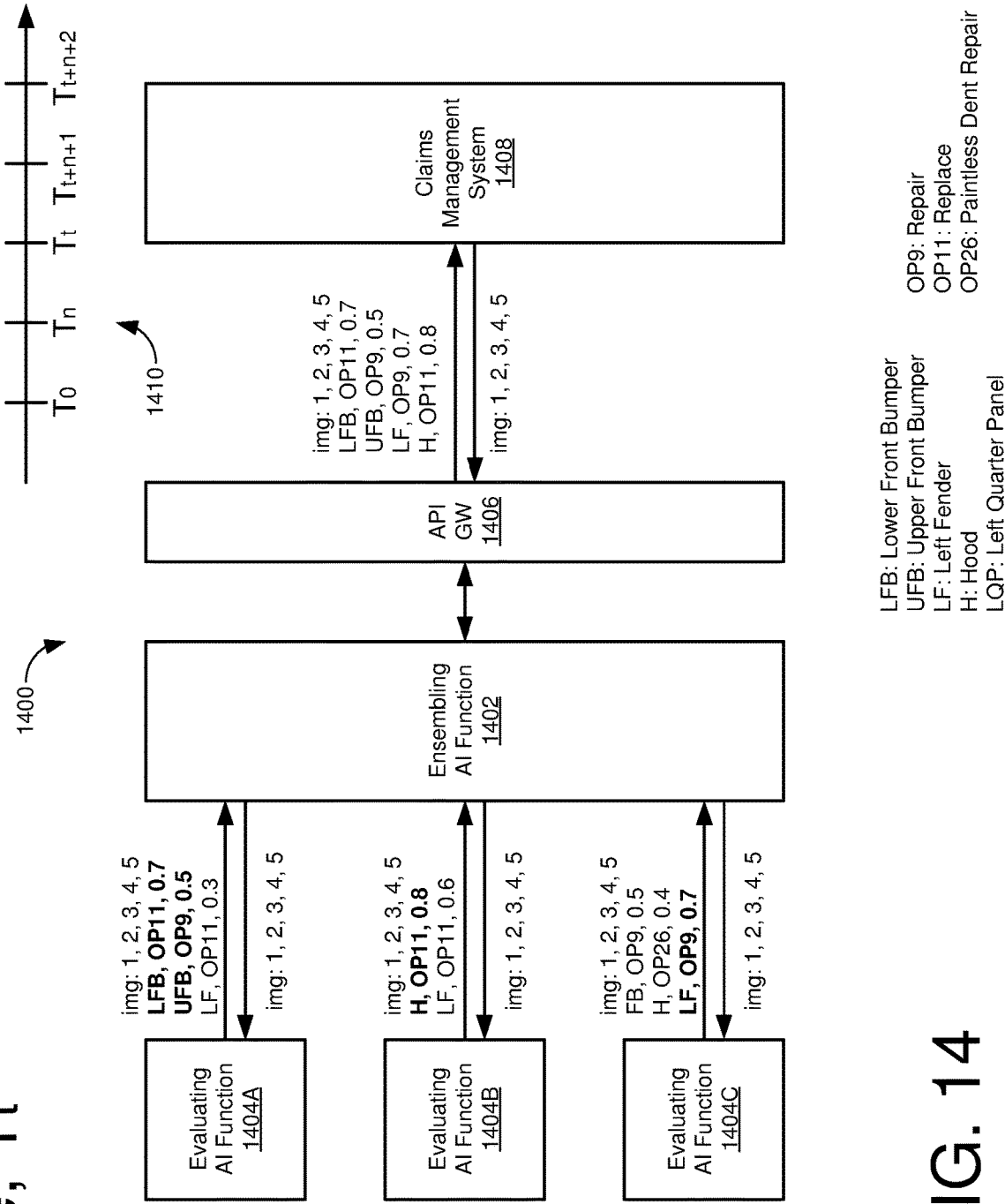
FIG. 14 illustrates an example operation at a time $T_t$ according to the adaptive ensembling process of FIG. 13.
Figure 15:
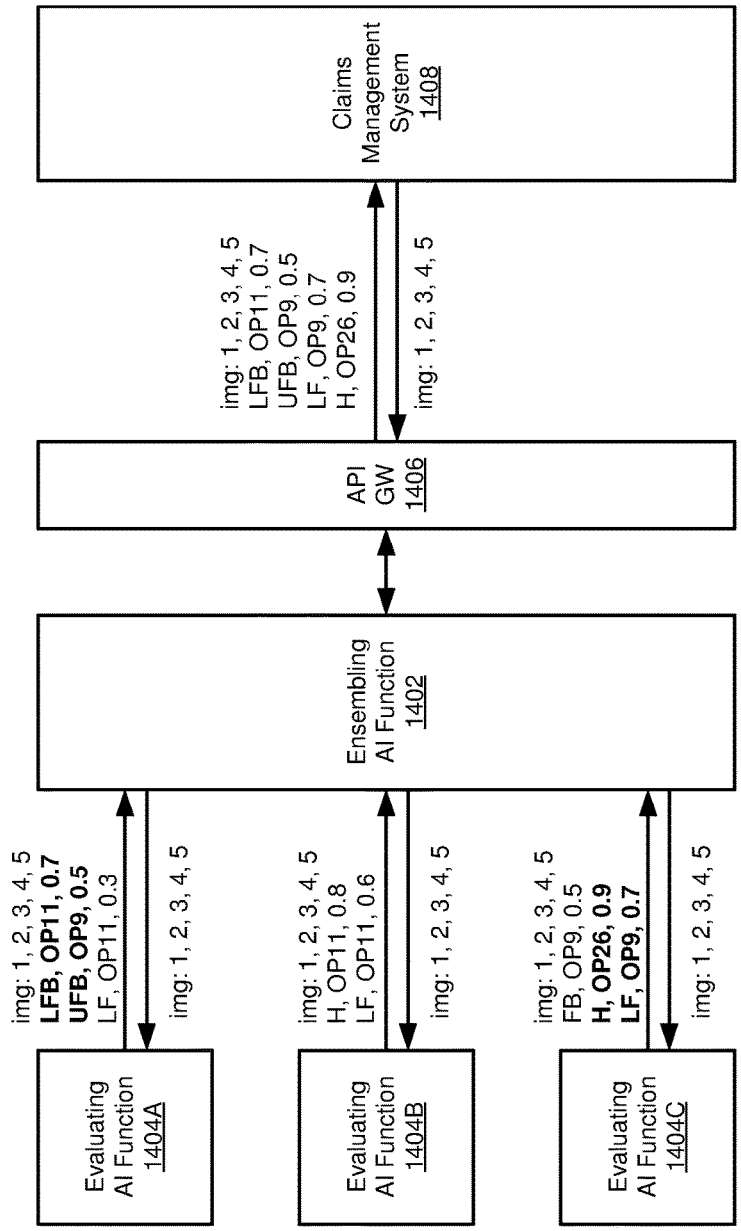
FIG. 15 illustrates an example operation after relearning the weights, at a time $T_{t+m+2}$, according to the adaptive ensembling process of FIG. 13.

FIGS. 14 and 15 illustrate example operations before and after adjusting the learned states according to the adaptive ensembling process 1300 of FIG. 13. In these examples, the learned states are weights, as described above.

FIG. 14 illustrates an example operation 1400 at a time $T_t$ according to the adaptive ensembling process 1300 of FIG. 13. FIG. 14 includes a timeline, at 1410. The timeline begins at an initial time $T_0$, where no weights have been learned. Later, at time $T_n$, weights have been learned. After the weights have been learned, the example operation 1400 takes place at $T_t$.

Referring to FIG. 14, the ensembling AI function 1402 receives a claim package from a claims management system 1408 via an API GW 1406. For clarity, only the images in the claim package are discussed. However, it should be appreciated that the claim package may contain other data objects in addition to, or instead of, the images, and that those data objects may be treated in a similar manner.

The claim package includes five images 1,2,3,4,5 of a damaged vehicle. The ensembling AI function 1402 distributes the images to the evaluating AI functions 1404. In this example, the ensembling AI function 1402 distributes all of the images to each of the evaluating AI functions 1404. The evaluating AI functions 1404 process the images.

Each of the evaluating AI functions 1404 returns a different recommendation set. The evaluating AI function 1404A returns a recommendation set that includes images 1,2,3,4,5 and three recommended operations with components and scores. The legend in FIG. 14 indicates identifiers for components and operations. One of the recommended operations is LFB, OP11, 0.7, which indicates replacement of the lower front bumper with a score of 0.7. Another recommended operation is UFB, OP9, 0.5, which indicates repair of the upper front bumper with a score of 0.5. The remaining recommended operation is LF, OP11, 0.3, which indicates replacement of the left fender with a score of 0.3.

The evaluating AI function 1404B returns a recommendation set that includes images 1,2,3,4,5 and two recommended operations with components and scores. One of the recommended operations is H, OP1, 0.8, which indicates replacement of the hood with a score of 0.8. The other recommended operation is LF, OP11, 0.6, which indicates a replacement of the left fender with a score of 0.6.

The evaluating AI function 1404C returns a recommendation set that includes images 1,2,3,4,5 and three recommended operations with components and scores. One of the recommended operations is FB, OP9, 0.5, which indicates repair of the front bumper with a score of 0.5. Another recommended operation is H, OP26, 0.4, which indicates paintless dent repair of the hood with a score of 0.4. Another recommended operation is LF, OP9, 0.7, which indicates a repair of the left fender.

Each of the recommendation sets includes a different recommended operation for the left fender, each with a different learned weight. In this example, the recommended operation provided by the evaluating AI function 1404C has the highest weight, and is selected instead of the recommended operations provided by the other evaluating AI functions 1404A,B, as shown in bold font in FIG. 14.

Two of the recommendation sets include different recommended operations for the hood, each with a different learned weight. In this example, the recommended operation provided by the evaluating AI function 1404B has the higher weight, and is selected instead of the recommended operation provided by the evaluating AI function 1404C, as shown in bold font in FIG. 14.

Two of the recommendation sets include different recommended operations for the front bumper. In this example, it is not necessary to consider the weights of these recommended operations because the recommended operations provided by the evaluating AI function 1404A provide greater granularity, and are selected for that reason instead of the single recommended operation provided by the evaluating AI function 1404C, as shown in bold font in FIG. 14.

Some time after operation 1400, the weights are relearned, at time $T_{t+n+1}$. FIG. 15 illustrates an example operation 1500 after relearning the weights, at a time $T_{t+n+2}$, according to the adaptive ensembling process 1300 of FIG. 13.

For clarity of explanation, FIG. 15 concerns the same claim package as FIG. 14. In FIG. 15, the evaluating AI function 1404C now has a higher weight for the hood operation than the evaluating AI function 1404B, as shown in bold font in FIG. 15. Therefore the ensembling AI function 1402 selects the hood operation provided by the evaluating AI function 1404B for inclusion in the composite vehicle repair recommendation set, as shown in FIG. 15.

The disclosed adaptive ensembling techniques provides several advantages. One advantage is that it not only learns and uses the strengths of the evaluating AI functions, but also relearns those strengths over times as the evaluating AI functions change, or are replaced.

Figure 16:
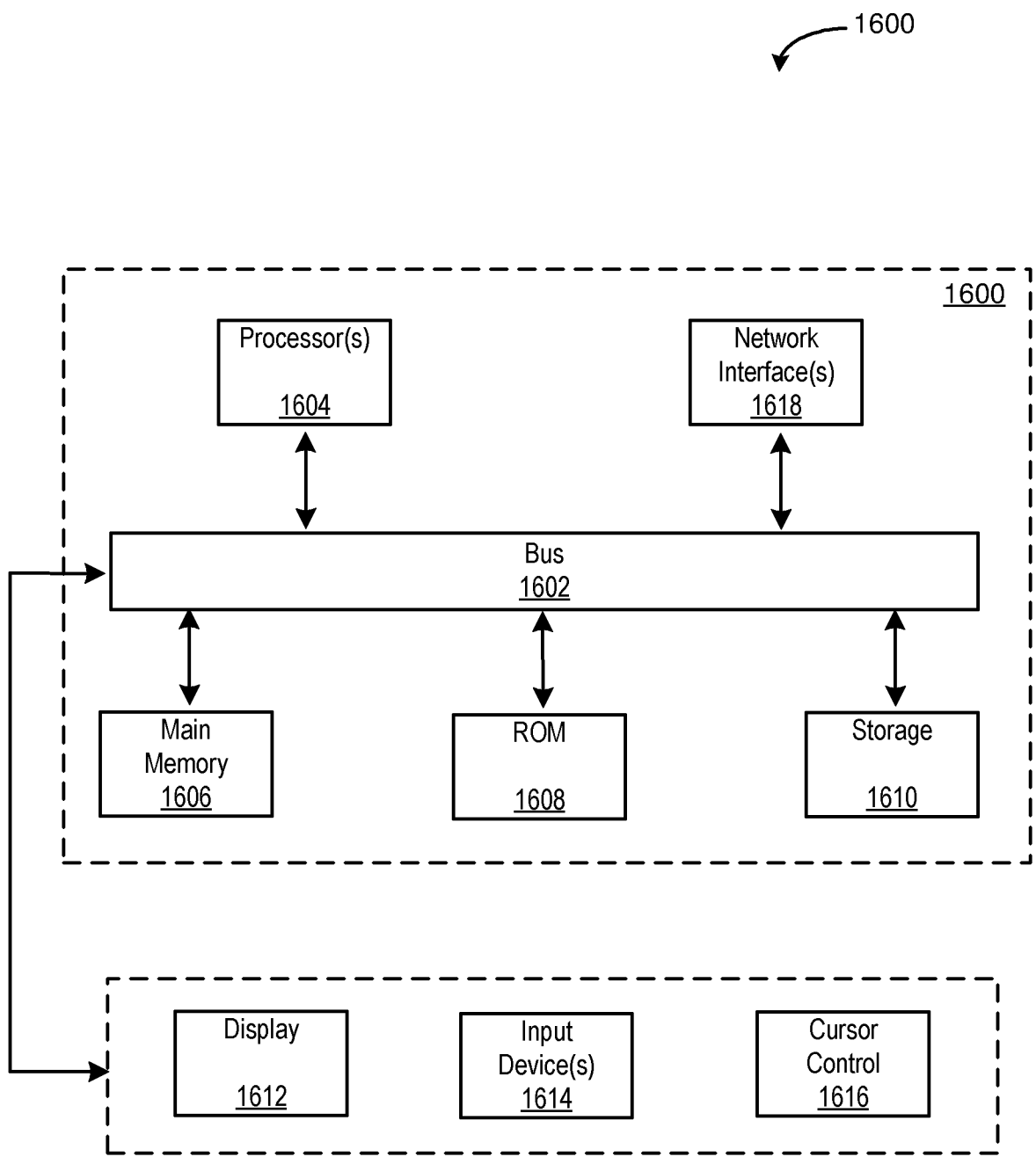
FIG. 16 is an example computing component that may be used to implement various features of embodiments described in the present disclosure.

FIG. 16 depicts a block diagram of an example computer system 1600 in which embodiments described herein may be implemented. The computer system 1600 includes a bus 1602 or other communication mechanism for communicating information, one or more hardware processors 1604 coupled with bus 1602 for processing information. Hardware processor(s) 1604 may be, for example, one or more general purpose microprocessors.

The computer system 1600 also includes a main memory 1606, such as a random access memory (RAM), cache and/or other dynamic storage devices, coupled to bus 1602 for storing information and instructions to be executed by processor 1604. Main memory 1606 also may be used for storing temporary variables or other intermediate information during execution of instructions to be executed by processor 1604. Such instructions, when stored in storage media accessible to processor 1604, render computer system 1600 into a special-purpose machine that is customized to perform the operations specified in the instructions.

The computer system 1600 further includes a read only memory (ROM) 1608 or other static storage device coupled to bus 1602 for storing static information and instructions for processor 1604. A storage device 1610, such as a magnetic disk, optical disk, or USB thumb drive (Flash drive), etc., is provided and coupled to bus 1602 for storing information and instructions.

The computer system 1600 may be coupled via bus 1602 to a display 1612, such as a liquid crystal display (LCD) (or touch screen), for displaying information to a computer user. An input device 1614, including alphanumeric and other keys, is coupled to bus 1602 for communicating information and command selections to processor 1604. Another type of user input device is cursor control 1616, such as a mouse, a trackball, or cursor direction keys for communicating direction information and command selections to processor 1604 and for controlling cursor movement on display 1612. In some embodiments, the same direction information and command selections as cursor control may be implemented via receiving touches on a touch screen without a cursor.

The computing system 1600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," "data store," and the like, as used herein, can refer to logic embodied in hardware or firmware, or to a collection of software instructions, possibly having entry and exit points, written in a programming language, such as, for example, Java, C, C++, and Python. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 1600 may implement the techniques described herein using customized hard-wired logic, one or more ASICs or FPGAs, firmware and/or program logic which in combination with the computer system causes or programs computer system 1600 to be a special-purpose machine. According to one embodiment, the techniques herein are performed by computer system 1600 in response to processor(s) 1604 executing one or more sequences of one or more instructions contained in main memory 1606. Such instructions may be read into main memory 1606 from another storage medium, such as storage device 1610. Execution of the sequences of instructions contained in main memory 1606 causes processor(s) 1604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1610. Volatile media includes dynamic memory, such as main memory 1606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1602. Transmission media can also take the form of acoustic or light waves, such as those generated during radio-wave and infra-red data communications.

The computer system 1600 also includes a communication interface 1618 coupled to bus 1602. Network interface 1618 provides a two-way data communication coupling to one or more network links that are connected to one or more local networks. For example, communication interface 1618 may be an integrated services digital network (ISDN) card, cable modem, satellite modem, or a modem to provide a data communication connection to a corresponding type of telephone line. As another example, network interface 1618 may be a local area network (LAN) card to provide a data communication connection to a compatible LAN (or a WAN component to communicate with a WAN). Wireless links may also be implemented. In any such implementation, network interface 1618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 1618, which carry the digital data to and from computer system 1600, are example forms of transmission media.

The computer system 1600 can send messages and receive data, including program code, through the network(s), network link and communication interface 1618. In the Internet example, a server might transmit a requested code for an application program through the Internet, the ISP, the local network and the communication interface 1618.

The received code may be executed by processor 1604 as it is received, and/or stored in storage device 1610, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, or a combination of hardware and software. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 1600.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method comprising:
   receiving a vehicle damage object for a damaged vehicle, wherein the vehicle damage object includes a plurality of metadata objects of the damaged vehicle;
   providing the vehicle damage object to a plurality of sources;
   receiving a plurality of vehicle repair recommendation sets for the damaged vehicle from the sources, wherein each of the vehicle repair recommendation sets identifies at least one recommended vehicle repair operation of a plurality of the vehicle repair operations for at least one component of the damaged vehicle, and wherein at least two of the vehicle repair recommendation sets identify different recommended vehicle repair operations for one of the components of the damaged vehicle;
   selecting, by a trained artificial intelligence function, one of the recommended vehicle repair operations for each component of the damaged vehicle based on a plurality of learned states associated with the recommended vehicle repair operations, wherein the learned states are weights, and wherein each source has a respective weight for each recommended vehicle repair operation for each component;
   generating a composite vehicle repair recommendation set that identifies the selected recommended vehicle repair operation;
   providing the composite vehicle repair recommendation set to one or more claims management systems; and
   repeatedly retraining the trained artificial intelligence function by adjusting the learned states according to the vehicle damage objects received, and the corresponding composite vehicle repair recommendation generated, since the last retraining of the trained artificial intelligence function.

2. The method of claim 1, wherein generating the composite vehicle repair recommendation set comprises:
   selecting one or more of the metadata objects of the damaged vehicle, and
   identifying the selected metadata objects in the generated composite vehicle repair recommendation set.

3. The method of claim 1, wherein:
   each of the vehicle repair recommendation sets identifies a score and/or confidence percentage for the recommended vehicle repair operation; and
   the method further comprises: identifying the scores for the recommended vehicle repair operations in the generated composite vehicle repair recommendation set.

4. The method of claim 1, wherein:
   each of the vehicle repair recommendation sets is generated by a respective further artificial intelligence function.

5. The method of claim 4, wherein:
   each of the further artificial intelligence functions is trained.

6. A system, comprising:
   a hardware processor; and
   a non-transitory machine-readable storage medium encoded with instructions executable by the hardware processor to perform a method comprising:

receiving a vehicle damage object for a damaged vehicle, wherein the vehicle damage object includes a plurality of metadata objects of the damaged vehicle;

providing the vehicle damage object to a plurality of sources;

receiving a plurality of vehicle repair recommendation sets for the damaged vehicle from the sources, wherein each of the vehicle repair recommendation sets identifies at least one recommended vehicle repair operation of a plurality of the vehicle repair operations for at least one component of the damaged vehicle, and wherein at least two of the vehicle repair recommendation sets identify different recommended vehicle repair operations for one of the components of the damaged vehicle;

selecting, by a trained artificial intelligence function, one of the recommended vehicle repair operations for each component of the damaged vehicle based on a plurality of learned states associated with the recommended vehicle repair operations, wherein the learned states are weights, and wherein each source has a respective weight for each recommended vehicle repair operation for each component;

generating a composite vehicle repair recommendation set that identifies the selected recommended vehicle repair operation;

providing the composite vehicle repair recommendation set to one or more claims management systems; and repeatedly retraining the trained artificial intelligence function by adjusting the learned states according to the vehicle damage objects received, and the corresponding composite vehicle repair recommendation generated, since the last retraining of the trained artificial intelligence function.

7. The system of claim 6, wherein generating the composite vehicle repair recommendation set comprises:
selecting one or more of the metadata objects of the damaged vehicle, and
identifying the selected metadata objects in the generated composite vehicle repair recommendation set.

8. The system of claim 6, wherein:
each of the vehicle repair recommendation sets identifies a score and/or confidence percentage for the recommended vehicle repair operation; and
the method further comprises: identifying the scores for the recommended vehicle repair operations in the generated composite vehicle repair recommendation set.

9. The system of claim 6, wherein:
each of the vehicle repair recommendation sets is generated by a respective further artificial intelligence function.

10. The system of claim 9, wherein:
each of the further artificial intelligence functions is trained.

11. The system of claim 10, the method further comprising:
requesting one or more of the further artificial intelligence functions be re-trained when a predetermined event occurs.

12. A non-transitory machine-readable storage medium encoded with instructions executable by a hardware processor of a computing component, the machine-readable storage medium comprising instructions to cause the hardware processor to perform a method comprising:

receiving a vehicle damage object for a damaged vehicle, wherein the vehicle damage object includes a plurality of metadata objects of the damaged vehicle;

providing the vehicle damage object to a plurality of sources;

receiving a plurality of vehicle repair recommendation sets for the damaged vehicle from the sources, wherein each of the vehicle repair recommendation sets identifies at least one recommended vehicle repair operation of a plurality of the vehicle repair operations for at least one component of the damaged vehicle, and wherein at least two of the vehicle repair recommendation sets identify different recommended vehicle repair operations for one of the components of the damaged vehicle;

selecting, by a trained artificial intelligence function, one of the recommended vehicle repair operations for each component of the damaged vehicle based on a plurality of learned states associated with the recommended vehicle repair operations, wherein the learned states are weights, and wherein each source has a respective weight for each recommended vehicle repair operation for each component;

generating a composite vehicle repair recommendation set that identifies the selected recommended vehicle repair operation;

providing the composite vehicle repair recommendation set to one or more claims management systems; and repeatedly retraining the trained artificial intelligence function by adjusting the learned states according to the vehicle damage objects received, and the corresponding composite vehicle repair recommendation generated, since the last retraining of the trained artificial intelligence function.

13. The non-transitory machine-readable storage medium of claim 12, wherein generating the composite vehicle repair recommendation set comprises:
selecting one or more of the metadata objects of the damaged vehicle, and
identifying the selected metadata objects in the generated composite vehicle repair recommendation set.

14. The non-transitory machine-readable storage medium of claim 12, wherein:
each of the vehicle repair recommendation sets identifies a score and/or confidence percentage for the recommended vehicle repair operation; and
the method further comprises: identifying the scores for the recommended vehicle repair operations in the generated composite vehicle repair recommendation set.

15. The non-transitory machine-readable storage medium of claim 12, wherein:
each of the vehicle repair recommendation sets is generated by a respective further artificial intelligence function.

16. The non-transitory machine-readable storage medium of claim 15, wherein:
each of the further artificial intelligence functions is trained.

17. The non-transitory machine-readable storage medium of claim 16, the method further comprising:
requesting one or more of the further artificial intelligence functions be re-trained when a predetermined event occurs.

* * * * *